US008788475B2

(12) United States Patent
Fredricksen et al.

(10) Patent No.: US 8,788,475 B2
(45) Date of Patent: Jul. 22, 2014

(54) SYSTEM AND METHOD OF ACCESSING A DOCUMENT EFFICIENTLY THROUGH MULTI-TIER WEB CACHING

(75) Inventors: Eric Russell Fredricksen, San Francisco, CA (US); Fritz John Schneider, San Francisco, CA (US); Jeffrey Adgate Dean, Palo Alto, CA (US); Sanjay Ghemawat, Mountain View, CA (US); Niels Provos, Mountain View, CA (US); Georges Harik, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/536,701

(22) Filed: Jun. 28, 2012

(65) Prior Publication Data

US 2012/0271852 A1 Oct. 25, 2012

Related U.S. Application Data

(63) Continuation of application No. 12/251,413, filed on Oct. 14, 2008, now Pat. No. 8,275,790, which is a continuation of application No. 10/882,795, filed on Jun. 30, 2004, now Pat. No. 7,437,364.

(51) Int. Cl.
*G06F 17/30* (2006.01)

(52) U.S. Cl.
USPC .................... 707/705; 707/689; 711/118

(58) Field of Classification Search
CPC ........... G06F 17/30902; H04L 67/2852; H04L 29/12811; H04L 61/6009; H04L 29/12216; Y10S 707/99932
USPC ............... 707/705, 999.003, 999.002, 689; 711/118
See application file for complete search history.

(56) References Cited

U.S. PATENT DOCUMENTS

| 4,953,106 A | 8/1990 | Gansner et al. |
| 5,450,535 A | 9/1995 | North |

(Continued)

FOREIGN PATENT DOCUMENTS

| EP | 1182589 A2 | 2/2002 |
| GB | 2317723 A | 4/1998 |

(Continued)

OTHER PUBLICATIONS

Cohen et al., "Proactive Caching of DNS Records: Addressing a Performance Bottleneck", In Proc. Symp. Applications and the Internet (SAINT), San Diego, CA, Jan. 2001, pp. 85-94 (10 pages).*

(Continued)

*Primary Examiner* — Phuong Thao Cao
(74) *Attorney, Agent, or Firm* — Morgan, Lewis & Bockius LLP

(57) ABSTRACT

Upon receipt of a document request, a client assistant examines its cache for the document. If not successful, a server searches for the requested document in its cache. If the server copy is still not fresh or not found, the server seeks the document from its host. If the host cannot provide the copy, the server seeks it from a document repository. Certain documents are identified from the document repository as being fresh or stable. Information about each of these identified documents is transmitted to the server which inserts entries into an index if the index does not already contain an entry for the document. If and when this particular document is requested, the document will not be present in the server, however the server will contain an entry directing the server to obtain the document from the document repository rather than the document's web host.

20 Claims, 20 Drawing Sheets

(56) References Cited

U.S. PATENT DOCUMENTS

| | | | |
|---|---|---|---|
| 5,559,984 A * | 9/1996 | Nakano et al. | 711/121 |
| 5,727,129 A | 3/1998 | Barrett et al. | |
| 5,748,954 A | 5/1998 | Mauldin | |
| 5,752,241 A | 5/1998 | Cohen | |
| 5,802,292 A | 9/1998 | Mogul | |
| 5,832,494 A | 11/1998 | Egger et al. | |
| 5,835,905 A | 11/1998 | Pirolli et al. | |
| 5,848,407 A | 12/1998 | Ishikawa et al. | |
| 5,878,223 A | 3/1999 | Becker et al. | |
| 5,946,697 A | 8/1999 | Shen | |
| 5,978,791 A | 11/1999 | Farber et al. | |
| 5,978,847 A | 11/1999 | Kisor et al. | |
| 6,003,030 A | 12/1999 | Kenner et al. | |
| 6,014,678 A | 1/2000 | Inoue et al. | |
| 6,016,512 A * | 1/2000 | Huitema | 709/245 |
| 6,023,726 A | 2/2000 | Saksena | |
| 6,029,175 A | 2/2000 | Chow et al. | |
| 6,055,569 A | 4/2000 | O'Brien et al. | |
| 6,067,565 A | 5/2000 | Horvitz | |
| 6,085,193 A | 7/2000 | Malkin et al. | |
| 6,085,226 A | 7/2000 | Horvitz | |
| 6,088,707 A | 7/2000 | Bates et al. | |
| 6,098,064 A | 8/2000 | Pirolli et al. | |
| 6,108,703 A * | 8/2000 | Leighton et al. | 709/226 |
| 6,128,644 A | 10/2000 | Nozaki | |
| 6,128,701 A | 10/2000 | Malcolm et al. | |
| 6,134,551 A | 10/2000 | Aucsmith | |
| 6,134,583 A | 10/2000 | Herriot | |
| 6,167,438 A | 12/2000 | Yates et al. | |
| 6,170,013 B1 | 1/2001 | Murata | |
| 6,178,461 B1 | 1/2001 | Chan et al. | |
| 6,182,122 B1 | 1/2001 | Berstis | |
| 6,182,133 B1 | 1/2001 | Horvitz | |
| 6,195,622 B1 | 2/2001 | Altschuler et al. | |
| 6,205,481 B1 | 3/2001 | Heddaya et al. | |
| 6,230,168 B1 | 5/2001 | Unger et al. | |
| 6,272,534 B1 | 8/2001 | Guha | |
| 6,282,542 B1 | 8/2001 | Carneal et al. | |
| 6,285,999 B1 | 9/2001 | Page | |
| 6,292,880 B1 | 9/2001 | Mattis et al. | |
| 6,317,777 B1 | 11/2001 | Skarbo et al. | |
| 6,338,066 B1 | 1/2002 | Martin et al. | |
| 6,341,311 B1 | 1/2002 | Smith et al. | |
| 6,405,252 B1 | 6/2002 | Gupta et al. | |
| 6,421,726 B1 | 7/2002 | Kenner et al. | |
| 6,442,549 B1 * | 8/2002 | Schneider | 1/1 |
| 6,484,143 B1 | 11/2002 | Swildens et al. | |
| 6,493,702 B1 | 12/2002 | Adar et al. | |
| 6,502,125 B1 | 12/2002 | Kenner et al. | |
| 6,516,320 B1 | 2/2003 | Odom et al. | |
| 6,526,479 B2 * | 2/2003 | Rosenzweig | 711/133 |
| 6,532,520 B1 | 3/2003 | Dean et al. | |
| 6,542,964 B1 | 4/2003 | Scharber | |
| 6,553,411 B1 | 4/2003 | Dias et al. | |
| 6,578,113 B2 | 6/2003 | Krishnamurthy | |
| 6,581,090 B1 | 6/2003 | Lindbo et al. | |
| 6,584,498 B2 | 6/2003 | Nguyen | |
| 6,611,908 B2 * | 8/2003 | Lentz et al. | 712/29 |
| 6,625,643 B1 | 9/2003 | Colby et al. | |
| 6,631,451 B2 | 10/2003 | Glance et al. | |
| 6,638,314 B1 | 10/2003 | Meyerzon et al. | |
| 6,647,421 B1 | 11/2003 | Logue et al. | |
| 6,665,726 B1 | 12/2003 | Leighton et al. | |
| 6,701,316 B1 * | 3/2004 | Li et al. | 370/395.41 |
| 6,701,329 B1 * | 3/2004 | Esibov et al. | 1/1 |
| 6,725,214 B2 * | 4/2004 | Garcia-Chiesa | 1/1 |
| 6,742,033 B1 | 5/2004 | Smith et al. | |
| 6,744,452 B1 | 6/2004 | McBrearty et al. | |
| 6,745,295 B2 * | 6/2004 | Rodriguez | 711/136 |
| 6,757,733 B2 | 6/2004 | Gupta | |
| 6,766,313 B1 | 7/2004 | Kromann | |
| 6,766,352 B1 | 7/2004 | McBrearty et al. | |
| 6,766,422 B2 | 7/2004 | Beyda | |
| 6,772,225 B1 | 8/2004 | Jennings et al. | |
| 6,782,393 B1 | 8/2004 | Balabanovic et al. | |
| 6,813,690 B1 | 11/2004 | Lango et al. | |
| 6,853,391 B2 | 2/2005 | Bates et al. | |
| 6,883,135 B1 | 4/2005 | Obata et al. | |
| 6,912,591 B2 | 6/2005 | Lash | |
| 6,973,457 B1 | 12/2005 | Bastawala et al. | |
| 7,003,566 B2 | 2/2006 | Codella et al. | |
| 7,035,921 B1 | 4/2006 | Baker | |
| 7,051,111 B1 | 5/2006 | Scullin | |
| 7,095,949 B2 * | 8/2006 | Okada | 386/241 |
| 7,100,123 B1 | 8/2006 | Todd et al. | |
| 7,130,872 B2 | 10/2006 | de Bonet | |
| 7,130,890 B1 | 10/2006 | Kumar et al. | |
| 7,155,475 B2 * | 12/2006 | Agnoli et al. | 709/201 |
| 7,185,001 B1 | 2/2007 | Burdick et al. | |
| 7,228,350 B2 * | 6/2007 | Hong et al. | 709/226 |
| 7,249,053 B2 | 7/2007 | Wohlers et al. | |
| 7,328,401 B2 | 2/2008 | Obata et al. | |
| 7,343,397 B2 * | 3/2008 | Kochanski | 709/218 |
| 7,398,271 B1 | 7/2008 | Borkovsky et al. | |
| 7,415,536 B2 * | 8/2008 | Nakazawa | 709/245 |
| 7,426,576 B1 * | 9/2008 | Banga et al. | 709/245 |
| 7,437,364 B1 | 10/2008 | Fredricksen et al. | |
| 7,437,409 B2 | 10/2008 | Danieli | |
| 7,437,725 B1 * | 10/2008 | Chang et al. | 718/100 |
| 7,461,155 B2 | 12/2008 | Reisman | |
| 7,523,181 B2 * | 4/2009 | Swildens et al. | 709/223 |
| 7,548,908 B2 | 6/2009 | Fu et al. | |
| 7,565,425 B2 | 7/2009 | Van Vleet et al. | |
| 7,627,628 B2 * | 12/2009 | King et al. | 709/203 |
| 7,676,576 B1 * | 3/2010 | Kommula | 709/226 |
| 7,725,602 B2 * | 5/2010 | Liu et al. | 709/245 |
| 7,761,594 B1 | 7/2010 | Mowat | |
| 7,836,044 B2 | 11/2010 | Kamvar et al. | |
| 2001/0020248 A1 | 9/2001 | Banga et al. | |
| 2001/0033557 A1 | 10/2001 | Amalfitano | |
| 2001/0050875 A1 * | 12/2001 | Kahn et al. | 365/229 |
| 2002/0002618 A1 | 1/2002 | Vange | |
| 2002/0004813 A1 | 1/2002 | Agrawal et al. | |
| 2002/0007404 A1 * | 1/2002 | Vange et al. | 709/217 |
| 2002/0007413 A1 | 1/2002 | Garcia-Luna-Aceves et al. | |
| 2002/0016786 A1 | 2/2002 | Pitkow et al. | |
| 2002/0023159 A1 | 2/2002 | Vange et al. | |
| 2002/0031102 A1 * | 3/2002 | Wiedeman et al. | 370/316 |
| 2002/0048269 A1 * | 4/2002 | Hong et al. | 370/389 |
| 2002/0078087 A1 | 6/2002 | Stone | |
| 2002/0078371 A1 | 6/2002 | Heilig et al. | |
| 2002/0082811 A1 | 6/2002 | Honjas et al. | |
| 2002/0097261 A1 | 7/2002 | Gottfurcht et al. | |
| 2002/0107935 A1 | 8/2002 | Lowery et al. | |
| 2002/0143892 A1 | 10/2002 | Mogul | |
| 2002/0143984 A1 | 10/2002 | Michel | |
| 2002/0152361 A1 * | 10/2002 | Dean et al. | 711/160 |
| 2002/0156864 A1 | 10/2002 | Kniest | |
| 2002/0156980 A1 * | 10/2002 | Rodriguez | 711/136 |
| 2002/0161860 A1 | 10/2002 | Godlin et al. | |
| 2002/0178238 A1 * | 11/2002 | Fletcher et al. | 709/220 |
| 2002/0184340 A1 | 12/2002 | Srivastava et al. | |
| 2002/0188665 A1 | 12/2002 | Lash | |
| 2002/0191610 A1 | 12/2002 | Baek et al. | |
| 2002/0198883 A1 * | 12/2002 | Nishizawa et al. | 707/10 |
| 2002/0198961 A1 | 12/2002 | Krishnamurthy et al. | |
| 2003/0005152 A1 | 1/2003 | Diwan et al. | |
| 2003/0023813 A1 | 1/2003 | Malcolm | |
| 2003/0046343 A1 | 3/2003 | Krishnamurthy et al. | |
| 2003/0065743 A1 | 4/2003 | Jenny et al. | |
| 2003/0079027 A1 | 4/2003 | Slocombe et al. | |
| 2003/0079041 A1 * | 4/2003 | Parrella et al. | 709/247 |
| 2003/0084159 A1 | 5/2003 | Blewett | |
| 2003/0086098 A1 | 5/2003 | Sesek et al. | |
| 2003/0101234 A1 | 5/2003 | McBrearty et al. | |
| 2003/0158913 A1 * | 8/2003 | Agnoli et al. | 709/219 |
| 2003/0161611 A1 | 8/2003 | Okada | 386/69 |
| 2003/0167257 A1 | 9/2003 | de Bonet | |
| 2003/0172075 A1 | 9/2003 | Reisman | |
| 2003/0172183 A1 * | 9/2003 | Anderson et al. | 709/245 |
| 2003/0212779 A1 | 11/2003 | Boyter et al. | |
| 2003/0217173 A1 | 11/2003 | Butt et al. | |
| 2004/0032434 A1 * | 2/2004 | Pinsky et al. | 345/814 |
| 2004/0039798 A1 * | 2/2004 | Hotz et al. | 709/219 |

(56) References Cited

U.S. PATENT DOCUMENTS

| | | | |
|---|---|---|---|
| 2004/0049598 A1 | 3/2004 | Tucker et al. | |
| 2004/0064577 A1 | 4/2004 | Dahlin et al. | |
| 2004/0073707 A1* | 4/2004 | Dillon | 709/245 |
| 2004/0078453 A1 | 4/2004 | Bhogal et al. | |
| 2004/0078487 A1* | 4/2004 | Cernohous et al. | 709/245 |
| 2004/0107296 A1 | 6/2004 | Donker et al. | |
| 2004/0139282 A1* | 7/2004 | Yoshioka et al. | 711/133 |
| 2004/0205149 A1 | 10/2004 | Dillon et al. | |
| 2004/0205165 A1* | 10/2004 | Melamed et al. | 709/219 |
| 2004/0215665 A1* | 10/2004 | Edgar et al. | 707/200 |
| 2004/0225644 A1 | 11/2004 | Squillante et al. | |
| 2004/0230747 A1 | 11/2004 | Ims et al. | |
| 2004/0237044 A1 | 11/2004 | Travieso et al. | |
| 2004/0239681 A1 | 12/2004 | Robotham et al. | |
| 2004/0249971 A1* | 12/2004 | Klinker | 709/239 |
| 2004/0250119 A1* | 12/2004 | Shelest et al. | 713/201 |
| 2004/0260466 A1* | 12/2004 | Ichihara et al. | 701/209 |
| 2004/0262051 A1 | 12/2004 | Carro | |
| 2005/0033803 A1 | 2/2005 | Vleet et al. | |
| 2005/0038787 A1 | 2/2005 | Cheung et al. | |
| 2005/0138604 A1 | 6/2005 | Harrison | |
| 2005/0165778 A1 | 7/2005 | Obata et al. | |
| 2005/0165829 A1 | 7/2005 | Varasano | |
| 2005/0198224 A1 | 9/2005 | Kobayashi et al. | |
| 2005/0198327 A1* | 9/2005 | Iwamura et al. | 709/229 |
| 2005/0198386 A1* | 9/2005 | Accapadi et al. | 709/245 |
| 2005/0204064 A1* | 9/2005 | Ruiz | 709/245 |
| 2005/0246347 A1 | 11/2005 | Kobayashi | |
| 2005/0278222 A1 | 12/2005 | Nortrup | |
| 2005/0278417 A1 | 12/2005 | Fremantle et al. | |
| 2006/0047804 A1 | 3/2006 | Fredricksen et al. | |
| 2006/0085601 A1* | 4/2006 | Woffinden et al. | 711/133 |
| 2006/0089978 A1 | 4/2006 | Lee et al. | |
| 2006/0143568 A1 | 6/2006 | Milener et al. | |
| 2006/0156387 A1 | 7/2006 | Eriksen | |
| 2006/0167862 A1 | 7/2006 | Reisman | |
| 2006/0168348 A1 | 7/2006 | Casalaina | |
| 2006/0179123 A1 | 8/2006 | Smith | |
| 2006/0253612 A1* | 11/2006 | Cheshire | 709/245 |
| 2006/0271599 A1* | 11/2006 | Yamamoto et al. | 707/201 |
| 2006/0271642 A1 | 11/2006 | Stavrakos et al. | |
| 2006/0294223 A1 | 12/2006 | Glasgow et al. | |
| 2006/0294311 A1 | 12/2006 | Fu et al. | |
| 2007/0022102 A1* | 1/2007 | Saxena | 707/3 |
| 2007/0174774 A1 | 7/2007 | Lerman et al. | |
| 2007/0189708 A1 | 8/2007 | Lerman et al. | |
| 2007/0214052 A1 | 9/2007 | Kao | |
| 2007/0250841 A1 | 10/2007 | Scahill et al. | |
| 2007/0294480 A1* | 12/2007 | Moser | 711/133 |
| 2008/0010365 A1* | 1/2008 | Schneider | 709/223 |
| 2008/0140626 A1 | 6/2008 | Wilson | |
| 2008/0195819 A1 | 8/2008 | Dumont | |
| 2008/0222363 A1* | 9/2008 | Khemani et al. | 711/138 |
| 2008/0229017 A1* | 9/2008 | Plamondon | 711/118 |
| 2009/0049388 A1 | 2/2009 | Taib et al. | |
| 2009/0119286 A1 | 5/2009 | Reisman | |
| 2009/0276407 A1 | 11/2009 | Van Vleet et al. | |
| 2010/0257236 A1* | 10/2010 | Agnoli et al. | 709/203 |

FOREIGN PATENT DOCUMENTS

| | | |
|---|---|---|
| WO | WO 01/55897 A1 | 8/2001 |
| WO | WO 02/100117 A2 | 12/2002 |
| WO | WO 2005/006129 A2 | 1/2005 |

OTHER PUBLICATIONS

Cohen et al., "Proactive Caching of DNS Records: Addressing a Performance Bottleneck", In Proc. Symp. Applications and the Internet (SAINT), San Diego, CA, Jan. 2001, pp. 85-94 (Previously Provided).*

Jung, et al., "DNS Performance and the Effectiveness of Caching", In Proceedings of the First ACM SIGCOMM Internet Measurement Workshop (UMW 2001), ACM, 2001, 14 pages.*

Chandranmenon, et al., "Reducing Web Latency Using Reference Point Caching", In Proceedings of the Twentieth Annual Joint Conference of the IEEE Computer and Communications Societies (INFOCOM 2001), IEEE, 2001, pp. 1607-1616.*

Arocena, Applications of a Web Query Language, Aug. 12, 1997, pp. 1-15.

Banga, Optimistic Deltas for WWW Latency Reduction, USENIX Technical Conference, 1997, pp. 1-15.

Bestavros, Server-initiated Document Dissemination for the WWW, IEEE Data Engineering Bulletin, vol. 19, No. 3, Sep. 3-11, 1996, pp. 1-8.

Botafogo, Structural Analysis of Hypertexts: Identifying Hierarchies and Userful Metrics, ACM Transactions on Information Systems, vol. 10, No. 2, Apr. 1992, pp. 142-180.

Boyle, To Link or not to link: An empirical comparison of Hypertext linking strategies, ACM SIGDOC' 92; 1992; pp. 221-231.

Bruck, Weighted Bloom Filter, ISIT, Jul. 9-14, 2006, pp. 2304-2308.

Cao, A Study of Integrated Prefetching and Caching Strategies, Proceedings of 1995 ACM SIGMETRICS, Jun. 1995, 10 pgs.

Carriere, WebQuery: Searching and Visualizing the Web through Connectivity, Proceedings of the 6th International World Wide Web Conference; 1997; 12 pgs.

Chan, Cache-based Compaction: A New Technique for Optimizing Web Transfer, IEEE, 1999, 9 pgs.

Craswell, Effective Site Finding using Link Anchor Information, SIGIR '01, Sep. 9-12, 2001, pp. 250-257.

Curewitz, Practical Prefetching via Data Compression, SIGMOD '93, 1993, 10 pgs.

Doreian, A Measure of Standing for Citation Networks within a Wider Environment, Information Processing and Management, vol. 30, No. 1, 1994, pp. 21-31.

Doreian, Measuring the Relative Standing of Disciplinary Journals, Information Processing and Management, vol. 24, No. 1, 1988, pp. 45-56.

Douglis, Dynamic Suppression of Similarity in the Web: a Case for Deployable Detection Mechanisms, IBM Research Report, Jul. 11, 2002, 8 pgs.

Fan, Web Prefetching Between Low-Bandwidth Clients and Proxies: Potential and Performance, Proceedings of the ACM SIGMETRICS Conference, May 1999, pp. 1-13.

Frisse, Searching for Information in a Hypertext Medical Handbook, Communications of the ACM, vol. 31, No. 7, Jul. 1998, pp. 880-886.

Garfield, Citation Analysis as a Tool in Journal Evaluation, Essays of an Information Scientist, vol. 1, 1962-1973, pp. 527-544.

Geller, On the Citation Influence Methodology of Pinski and Narin, Information Processing and Management, vol. 14, 1978, pp. 93-95.

Gong, Bloom Filter-based XML Packets Filtering for Millions of Path Queries, Proceedings of the 21st International Conference on Data Engineering, 2005, 12 pgs.

Google Inc., International Search Report, PCT/US2005/022067, Oct. 1, 2006, 7 pgs.

Google Inc., International Search Report and Written Opinion, PCT/US2008/054167, Jul. 2, 2008, 8 pgs.

Google Inc., International Search Report and Written Opinion, PCT/US2008/088047, Feb. 23, 2009, 8 pgs.

Griffioen, Reducing File System Latency Using a Predictive Approach, Proceedings of 1994 Summer USENIX Conference, Jun. 1994, 12 pgs.

Gwertzman, The Case for Geographical Push-Caching, Proceedings of the 1995 Workshop on Hot Operating Systems, 1995, 5 pgs.

Henzinger, Measuring Index Quality Using Random Walks on the Web, Proceedings of the 8th International World Wide Web Conference, May 1999, 35 pgs.

Hubbell, An Input-Output Approach to Clique Identification, Sociometry, University of California Santa Barbara, 1965, pp. 377-399.

Katz, A New Status Index Derived from Sociometric Analysis, Psychometrika, vol. 18, No. 1, Mar. 1953, pp. 39-43.

Kimbrel, Integrated Parallel Prefetching and Caching, SIGMETRICS, 1996, pp. 262-263.

Kleinberg, Authoritative Sources in a Hyperlinked Environment, Journal of the ACM, vol. 46, No. 5, Sep. 1999, pp. 604-632.

(56) References Cited

OTHER PUBLICATIONS

Kroeger, Digital's Web Proxy Traces, <ftp://ftp.digital.com/pub/DEC/traces/proxy/webtraces.html>, Dec. 1996, 5 pgs.
Luotonen, World-Wide Web Proxies, Apr. 1994, pp. 1-8.
Marchiori, The Quest for Correct Information on the Web: Hyper Search Engines, 1997, 18 pgs.
Markatos, A Top-10 Approach to Prefetching on the Web, Technical Report No. 173, ICS-FORTH, Aug. 1996, pp. 1-15.
McBryan, GENVL and WWWW: Tools for Taming the Web, Proceedings of the First International World Wide Web Conference, May 1994; pp. 1-10.
Mizruchi, Techniques for Disaggregating Centrality Scores in Social Networks, Sociological Methodology, 1996, pp. 26-48.
Mogul, Delta Encoding in HTTP, Network Working Group, Jan. 2002, pp. 1-49.
Mogul, Potential Benefits of Delta Encoding and Data Compression for HTTP, ACM SIGCOMM '97, 14 pgs.
Padmanabhan, Using Predictive Prefetching to Improve World Wide Web Latency, ACM SIGCOMM Computer Communication Review, Jul. 1996, 15 pgs.
Palmer, Fido: A Cache That Learns to Fetch, Proceedings of the 17th International Conference on Very Large Data Bases, Sep. 1991, pp. 255-264.
Patterson, Informed Prefetching and Caching, Proceedings of the 15th ACM Symposium on Operating Systems Principles, May 11, 1995, 24 pgs.
Pinski, Citation Influence for Journal Aggregates of Scientific Publications: Theory, with Application to the Literature of Physics, Information Processing and Management, vol. 12, No. 5-A, 1976; pp. 297-312.
Ramer, Similarity, Probability and Database Organization,: Extended Abstract, IEEE, 1996; pp. 272-277.
Rhea, Value-Based Web Caching, Proceedings of the Twelfth International World Wide Web Conference, May 2003, 10 pgs.
Sakaguchi, A Browsing Tool for Multi-lingual Documents for Users without Multi-lingual Fonts, ACM, 1996; pp. 63-69.
Schilit, TeleWeb: Loosely Connected Access to the World Wide Web, Fifth International World Wide Web Conference, Paris France, May 6-10, 1996, 16 pgs.
Tait, Detection and Exploitation of File Working Sets, Proceedings of the Eleventh International Conference on Distributed Computing Systems, May 1991, 19 pgs.
Vitter, Optimal Prefetching via Data Compression, Journal of the ACM, vol. 43, Nov. 13, 1995, 20 pgs.
Wang, Prefetching in World Wide Web, IEEE, 1996; pp. 28-32.
Williams, Removal Policies in Network Caches for World-Wide Web Documents, Proceedings of ACM SIGCOMM '96 Conference, Aug. 1996, 14 pgs.

* cited by examiner

Index Cache 122

Object Archive 128

SYSTEM AND METHOD OF ACCESSING A DOCUMENT EFFICIENTLY THROUGH MULTI-TIER WEB CACHING

RELATED APPLICATIONS

This application is a continuation of U.S. patent application Ser. No. 12/251,413, filed Oct. 14, 2008, now U.S. Pat. No. 8,275,790, which is a continuation of U.S. patent application Ser. No. 10/882,795, filed Jun. 30, 2004, now U.S. Pat. No. 7,437,364, which are hereby incorporated by reference in their entirety.

This application is related to U.S. patent application Ser. No. 10/882,794, "System and Method of Accessing a Document Efficiently Through Multi-Tier Web Caching," filed Jun. 30, 2004, now U.S. Pat. No. 7,587,398, which is hereby incorporated by reference in its entirety.

FIELD OF THE INVENTION

The present invention relates generally to the field of a client-server computer network system, and in particular, to a system and method of accessing a document efficiently through web caching.

BACKGROUND OF THE INVENTION

Web browsing is becoming an inseparable part of our daily life. We routinely retrieve documents from the Internet through a web browser. However, document download speeds are not as fast as desired.

There are multiple factors behind low document download speeds. First, the bandwidth of the Internet infrastructure is limited. In particular, the bandwidth of some web hosts is very limited, which limits the download speed of documents from those web hosts. Second, the hypertext transfer protocol (HTTP), the data transfer standard adopted by most web server manufacturers and web browser developers, has some inherent inefficiencies. Third, certain important recommendations published in the official HTTP protocol standard for improving document download speeds have not been implemented by manufacturers or developers or both.

Nevertheless, given the current infrastructure and HTTP implementation, it is possible to significantly increase document download speed at little extra cost. A conventional approach to speeding up document download speeds is to establish a cache in the client computer. The web browser stores downloaded files, including static images and the like, in the cache so that those files do not need to be repeatedly downloaded. Well known mechanisms are used to determine when a file in the cache must be replaced. From the on-line subscriber's perspective, the caching of static images and other static content frequently viewed by the subscriber substantially reduces the average time required for the document to be rendered on the computer monitor screen, and therefore the user feels that the document can be downloaded very quickly from its host. Unfortunately, there are certain limitations to this conventional approach. For instance, the cache associated with the web browser is often too small to store a large number of documents. Further, the web browser sometimes cannot tell whether it a document in its cache is fresh, and therefore needlessly re-downloads the document.

In addition to slow document download speeds, another common experience during web browsing is that a user may not be able to access a requested document, either because it has been removed from a web host's file system or because the web host is temporarily out of service.

It would therefore be desirable to provide systems and methods that address the problems identified above, and thereby improve users' web browsing experience.

SUMMARY

A method of accessing a document includes receiving a request at a document server from a client including a URL of a document. The document server identifies a document copy corresponding to the URL and determines whether the first document copy is stale. If the first document copy is determined to be stale, then depending on a first condition, a repository copy of the document is retrieved from a search engine repository at a location that is independent of the URL. On a second condition, a host copy of the document is retrieved. In some embodiments, the first condition includes an availability condition with respect to a host associated with the URL.

In other embodiments, a method for accessing a document includes receiving at a server from a client a request including a fingerprint based on a URL of a document and a first value indicative of a first content of the document on the client. A copy of the first content on the server is identified using the first value and a second content of the document is identified using the fingerprint. A determination is made as to whether the second content is stale. A determination is also made as to an availability condition of a host content of the document from a first remote server associated with the fingerprint. If the availability condition is a first value, a repository content of the document is obtained from a second remote server having an address independent of the fingerprint.

In still another embodiment, a method for updating a cache index includes identifying a set of documents from a database, where the database indicates information about each of a set of documents which are stored in a document repository. Upon a first condition, for at least one of the set of documents, a respective entry in an index cache is inserted indicating that a document content of the at least one of the set of documents should be retrieved from the document repository at a location that is independent of a URL associated with the at least one of the set of documents.

BRIEF DESCRIPTION OF THE DRAWINGS

For a better understanding of the nature and embodiments of the invention, reference should be made to the Description of Embodiments below, in conjunction with the following drawings in which like reference numerals refer to corresponding parts throughout the figures.

Like reference numerals refer to corresponding parts throughout the several views of the drawings.

DESCRIPTION OF EMBODIMENTS

Figure 1:
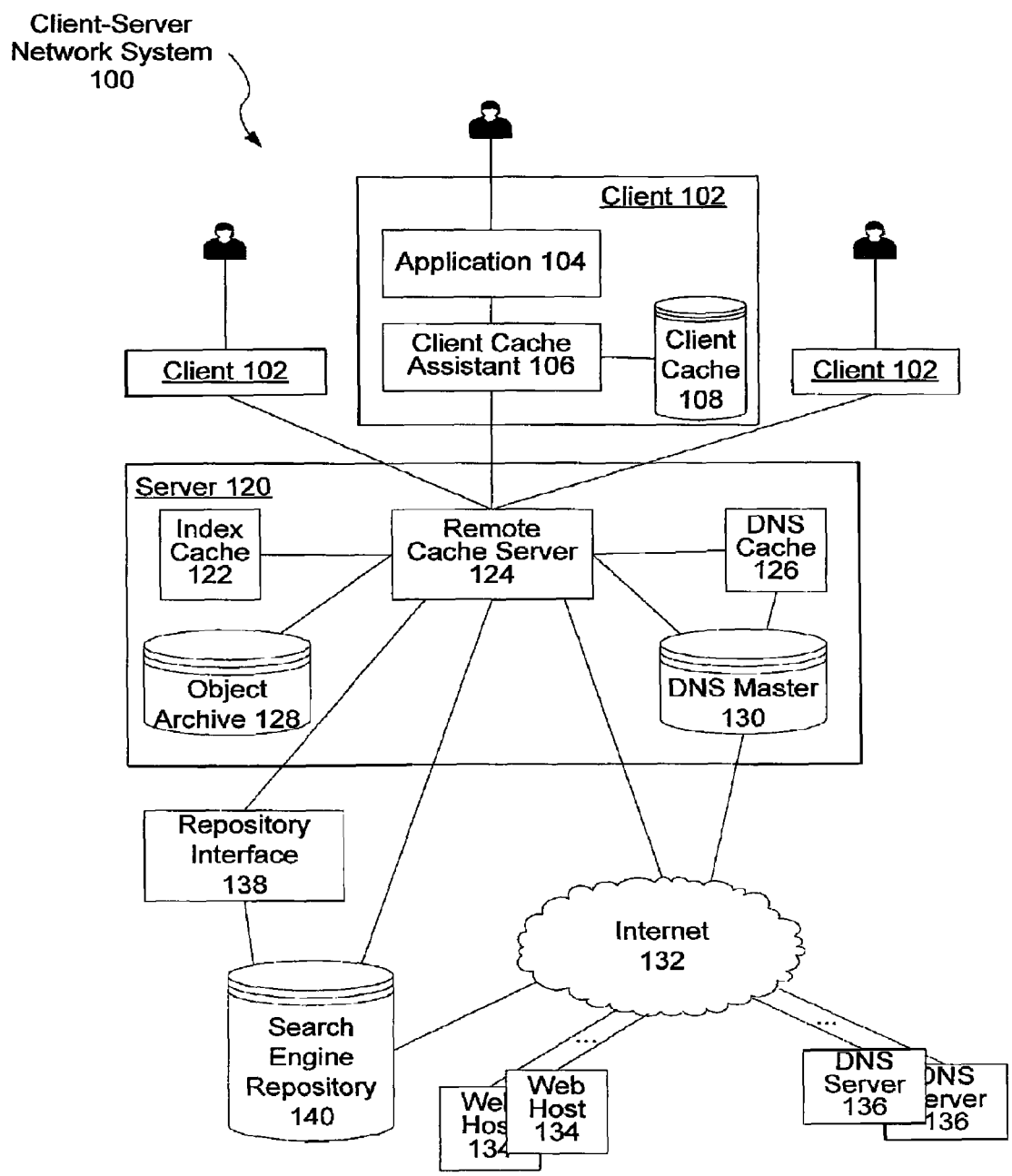
FIG. 1 schematically illustrates the infrastructure of a client-server network environment.

FIG. 1 schematically illustrates the infrastructure of a client-server network environment 100 in accordance with one embodiment of the present invention. The environment 100 includes a plurality of clients 102 and a document server 120. The internal structure of a client 102 includes an application 104 (e.g., a web browser 104), a client cache assistant 106 and a client cache 108. The client cache assistant 106 has communication channels with the application 104, the client cache 108 and a remote cache server 124 running in the server 120, respectively. The client cache assistant 106 and remote cache server 124 are procedures or modules that facilitate the process of responding quickly to a document request initiated by a user of the client 102.

In this embodiment, the application 104 has no associated cache or does not use its associated cache, and instead directs all user requests to the client cache assistant 106. While the following discussion assumes, for ease of explanation, that the application 104 is a web browser, the application can, in fact, be any application that uses documents whose source is a network address such as a URL (universal resource locator). Similarly, whenever the term "URL" is used in this document, that term shall be understood to mean a network address or location. In this context, the term "document" means virtually any type file that may be used by a web browser or other application, including but not limited to audio, video, or multimedia files. An advantage of the arrangement shown in FIG. 1 is that all the web browsers or other applications in client 102 can share the same client cache and thereby avoid data duplication. However, in another embodiment, web browser 104 uses its own cache (not shown). In this case, the client cache assistant 106 is responsible for keeping the browser's cache in synch with the client cache 108.

The server 120 includes at least a server cache 122 and 128. In some embodiments, the server 120 and/or the server cache 122/128 are deployed over multiple computers in order to provide fast access to a large number of cached documents. For instance, the server cache 122/128 may be deployed over N servers, with a mapping function such as the "modulo N" function being used to determine which cached documents are stored in each of the N servers. N may be an integer greater than 1, for instance an integer between 2 and 1024. For convenience of explanation, we will discuss the server 120 as though it were a single computer. The server 120, through its server cache 122/128, manages a large number of documents that have been downloaded from various hosts 134 (e.g., web servers and other hosts) over the communications network 132.

In an embodiment, the server 120 also includes an index cache 122, a DNS cache 126, an object archive 128 and a DNS master 130, which may be connected. In some embodiments, server 120 does not include the DNS cache 126 and DNS master 130. In some embodiments, these various components co-exist in a single computer, while in some other embodiments, they are distributed over multiple computers. The remote cache server 124 communicates with the other components in the server 120 as well as web hosts 134 and domain name system (DNS) servers 136 over the Internet 132. The term "web host" is used in this document to mean a host, host server or other source of documents stored at network locations associated with the web host. The remote cache server 124 may access a search engine repository 140, which caches a huge volume of documents downloaded from millions of web servers all over the world. These documents are indexed, categorized and refreshed by a search engine. The search engine repository 140 is especially helpful for satisfying a user request for a document when the connection between the remote cache server and the web host storing the document is interrupted, as well as when the web host is in operative or otherwise unable to respond to a request for the document. In some embodiments, a repository interface 138 is disposed between the remote cache server 124 and the search engine repository 140. The repository interface 138 identifies documents in the search engine repository 140 that have been determined to be stable or fresh. The repository interface 138 works with the remote cache server 124 to update the index cache 122 indicating that these documents are in the search engine repository 140.

In one embodiment, unlike the HTTP connection between a web browser and a web server, a persistent connection (sometimes herein called a dedicated connection) is established between the client cache assistant 106 and the remote cache server 124 using a suitable communication protocol (e.g., TCP/IP). This persistent connection helps to reduce the communication latency between the client cache assistant 106 and the remote cache server 124. In one embodiment, the persistent connection comprises at least one control stream and multiple data streams in each direction. A more detailed discussion of the components in the server 120 is provided below in connection with FIGS. 2-6.

Figure 2A:
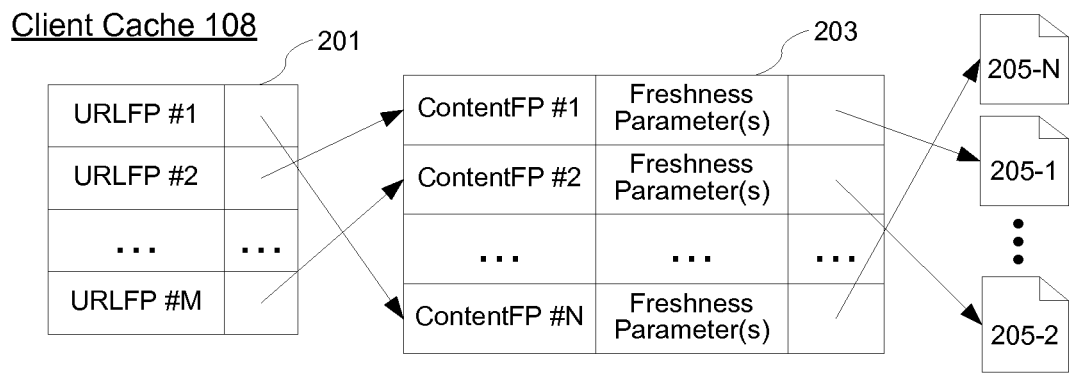
FIGS. 2A, 2B and 2C illustrate data structures associated with various components of the client-server network environment.
Figure 2A:
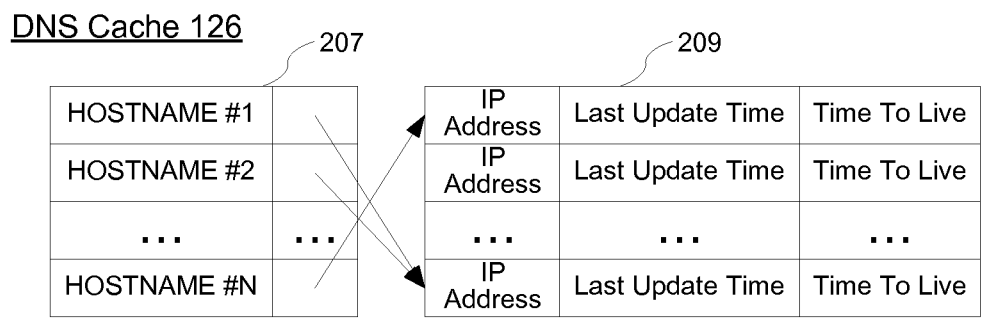
Figure 2B:
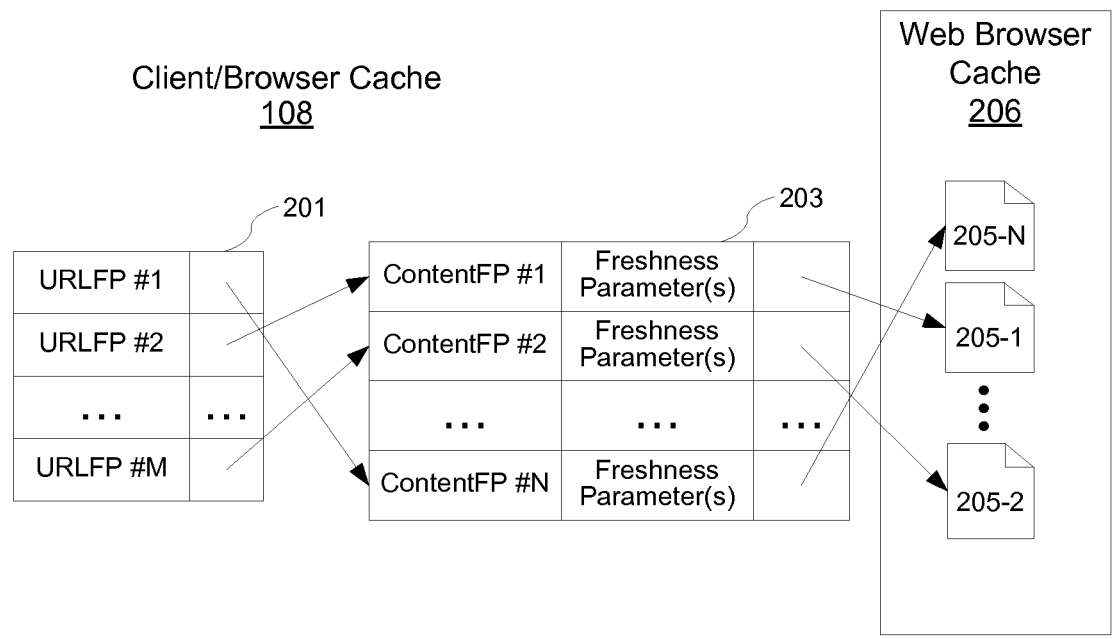
Figure 2C:
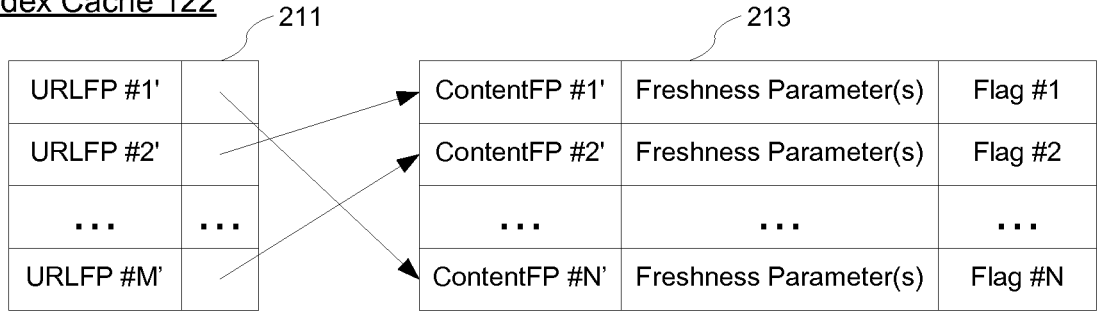
Figure 2C:
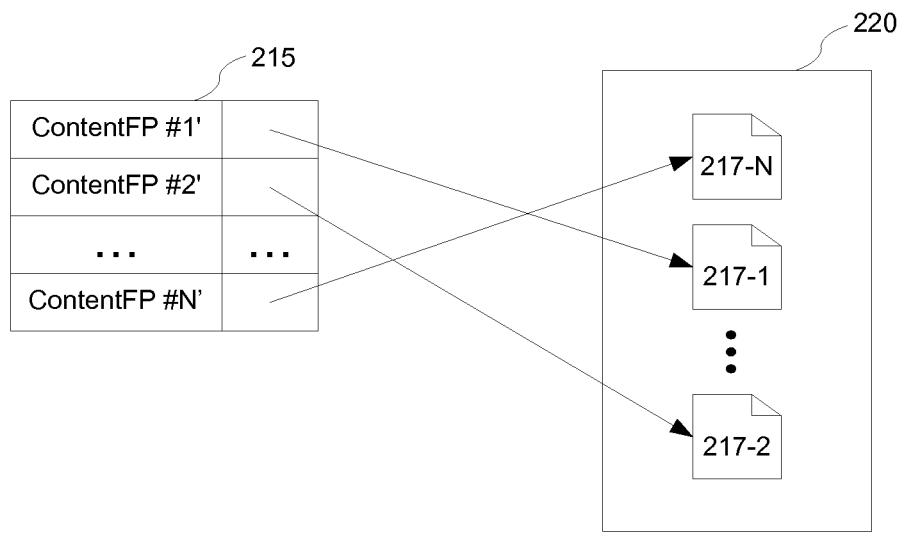
Figure 3:
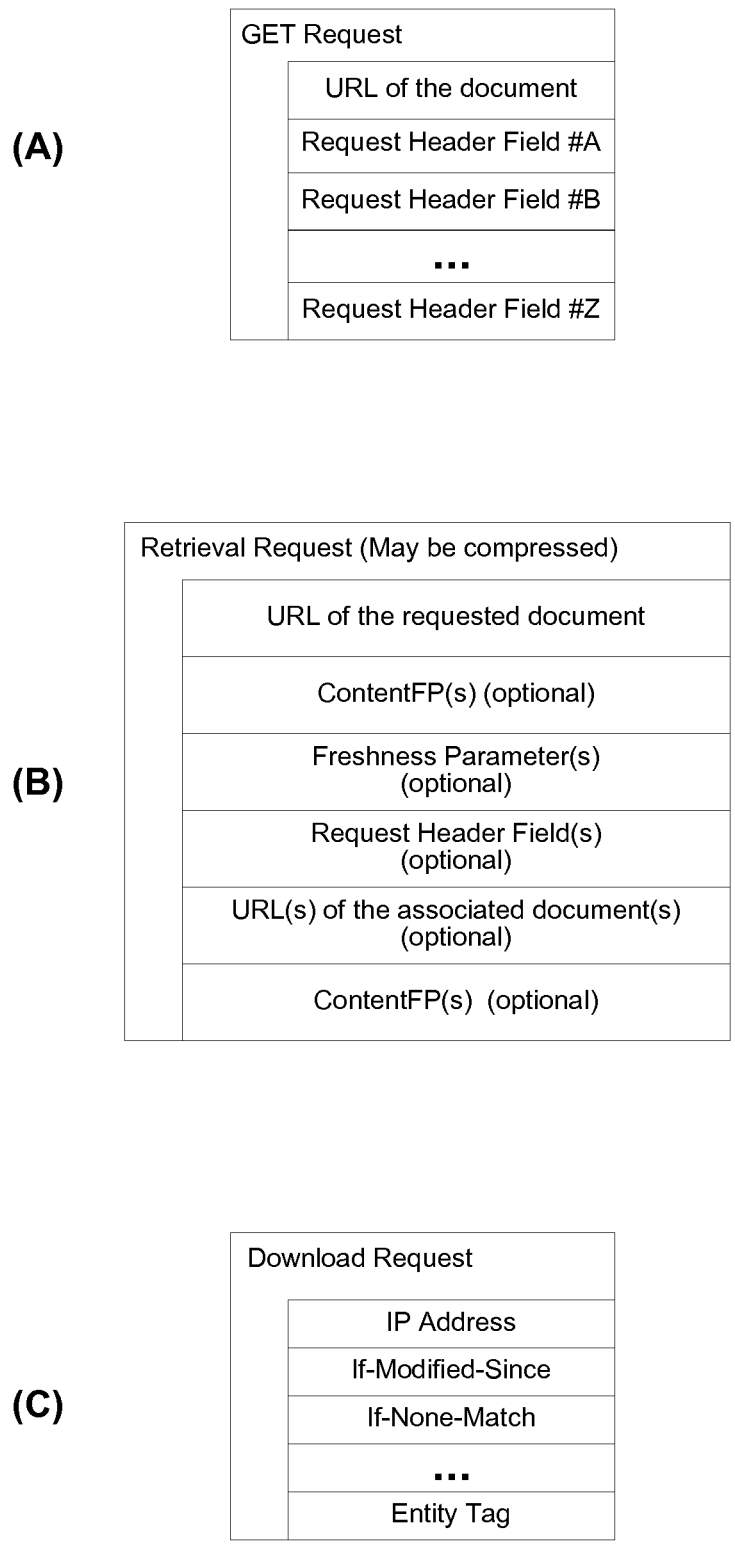
FIG. 3 illustrates data structures of respective requests received by a client cache assistant, a remote cache server and a web host.

FIGS. 2A-2C illustrate data structures associated with various components of the client-server network environment 100. Referring to FIG. 2A, in some embodiments, client cache 108 includes a table 201 including a plurality of universal resource locator (URL) fingerprints. A URL fingerprint is, for example, a 64-bit number (or a value of some other predetermined bit length) generated from the corresponding URL by first normalizing the URL text, e.g., by applying a predefined set of normalization rules to the URL text (e.g., converting web host names to lower case), and then applying a hash function to the normalized URL to produce a URL fingerprint. These URL fingerprints correspond to the documents in the client cache. Each entry in the URL fingerprint table 201 has a pointer to a unique entry in another table 203 that stores the content of a plurality of documents. Each entry in the table 203 includes a unique content fingerprint (also known as content checksum), one or more content freshness parameters and a pointer to a copy of the corresponding document (document content 205). In one embodiment, some of the content freshness parameters are derived from the HTTP header associated with the document content. For example, the Date field in the HTTP header indicates when the document was downloaded to the client.

In another embodiment, and in reference to FIG. 2B, the client cache 108 is merged with a web browser cache 206. In this embodiment table 203 of the client cache contains pointers to documents 205 in the web browser cache 206.

Referring back to FIG. 2A, DNS master 130 maintains a plurality of address records using a hostname table 207 and an internet protocol (IP) address table 209. For each entry in the hostname table 207, there is a single IP address in the table 209. It is possible that multiple hostnames, e.g., HOST #1 and HOST #2, may point to the same IP address. Since the IP address of a web host may be dynamically allocated, each IP address in the table 209 is also associated with a last update time (LUT) parameter, which indicates when the address record was last refreshed, and with a time to live (TTL) parameter, indicating how long the IP address will remain valid. This information is used, in combination with other information such as user visit frequencies to various web hosts, to determine when to refresh address records in the DNS master 130. In some embodiments, table 209 also associates a user visit frequency with each IP address in the table 209. In one embodiment, a plurality of the IP addresses in the table 209 each have an associated user visit frequency, while at least one IP address in the table 209 does not have an associated user visit frequency.

Compared with the volume of documents cached in a client 102, the volume of documents cached in the server 120 is often significantly larger, because a server often provides documents to multiple clients 102. As a result, it is impossible to store all the documents in the server's main memory. Accordingly, and referring to FIG. 2C, information about the large volume of cached documents in the server 120 is managed by two data structures, an index cache 122 and an object archive 128. The index cache 122 is small enough to be stored in the server's main memory to maintain a mapping relationship between a URL fingerprint (table 211), and a content fingerprint (table 213) of a document stored in the server 120. A mapping relationship between a content fingerprint and a location of a unique copy of a document content 217 (table 215) is stored in the object archive 128 along with document contents 217. In most embodiments, the table 215 is small enough to fit in the server's main memory and the documents 217 are stored in a secondary storage device 220, e.g., a hard drive. In some embodiments, table 215 is stored in the object archive 128 or other memory. In one embodiment, the index cache 122 stores a plurality of records, each record including a URL fingerprint, a content fingerprint and a set of content freshness parameters for a document cached by the remote cache server. In some embodiments, the set of freshness parameters includes an expiration date, a last modification date, and an entity tag. The freshness parameters optionally include one or more HTTP response header fields of a cached document. An entity tag is a unique string identifying one version of an entity, e.g., an HTML document, associated with a particular resource. In some embodiments, the record also includes a repository flag (table 213) that indicates that the corresponding document should be obtained from the search engine repository 140. The first time the document is requested by a client, a copy of the document will not be resident in the object archive 128 even though the document's URL fingerprint has an entry in index cache 122. For these documents, when the document is first requested by a client, the document is retrieved from the search engine repository instead of the document host and a copy of the retrieved document is sent to the requestor. The document content may be stored in the object archive 128. The document's host is then queried for the most recent version of the document content, which is then stored in the object archive 128.

Figure 4:
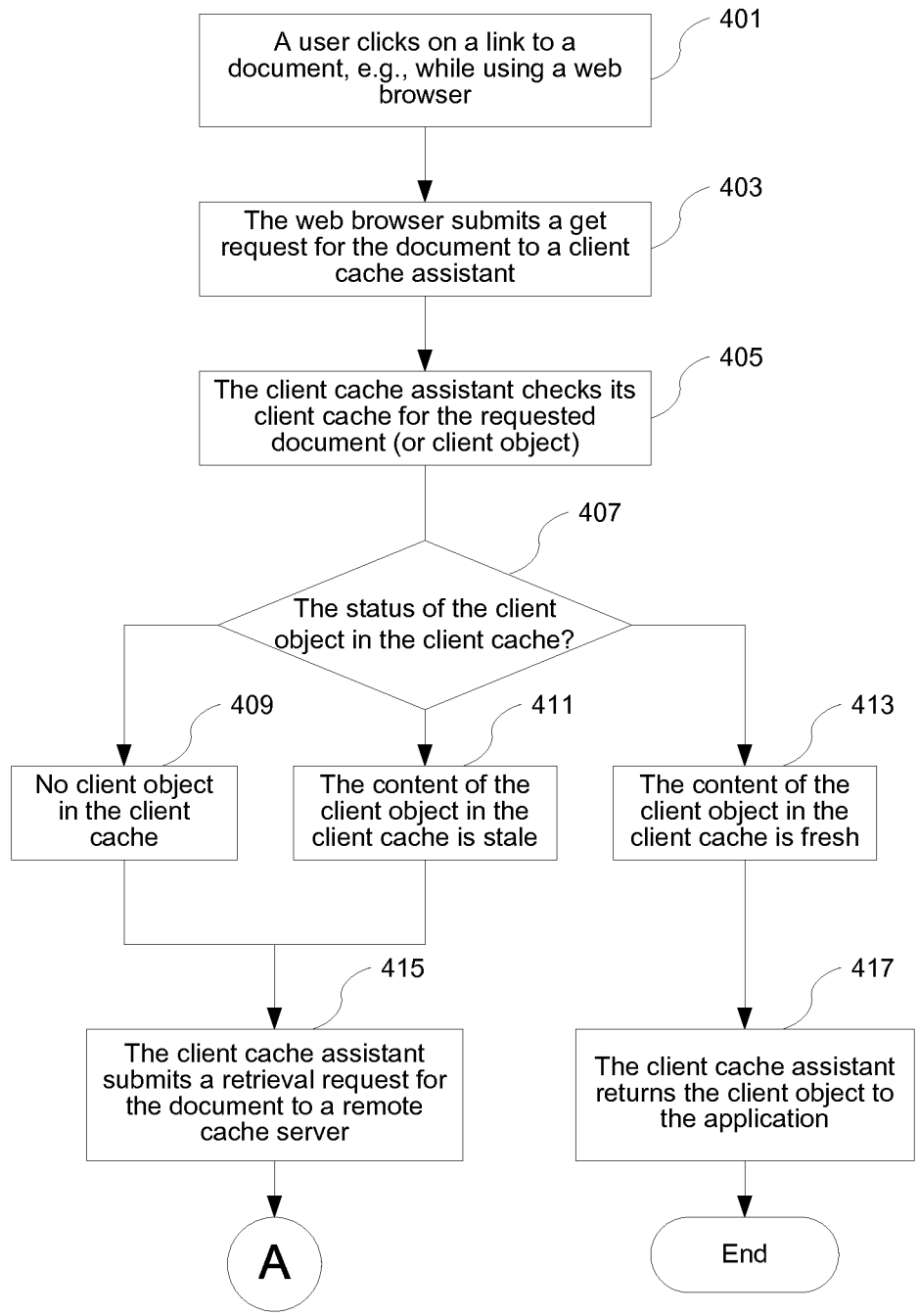
FIG. 4 is a flowchart illustrating how the client cache assistant responds to a get request from a user through an application.

Referring to FIG. 4, the operation of the client-server network environment 100 according to one embodiment of the present invention starts with a user clicking on a link to a document, for example while using a web browser (401). There is an embedded URL associated with the link including the name of a web server that hosts the document. Instead of submitting a document download request directly to the web host, the web browser submits a HTTP GET request for the document to a client cache assistant (403). An exemplary GET request is shown in FIG. 3A. The request includes the URL of the requested document as well as a plurality of standard HTTP request header fields, such as "Accept", "Accept-Language", "User-Agent" and "Host", etc. At 405, the client cache assistant first converts the document's URL into a URL fingerprint and then checks if its client cache has the requested document.

There are three possible outcomes from the client cache check (407). The result may be a cache miss, because the client cache does not have a copy of the requested document (409). A cache miss typically occurs when the user requests a document for the first time, or when a prior version of the document is no longer valid or present in the client cache (e.g., because it became stale, or the client cache became full). Otherwise, the result is a cache hit, which means that the client cache has a copy of the requested document. However, a cache hit does not guarantee that this copy can be provided to the requesting user. For example, if the timestamp of the cached copy indicates that its content might be out of date or stale, the client cache assistant may decide not to return the cached copy to the client (411). If the document content of the cached copy is deemed fresh (413), the client cache assistant identifies the requested document as well as other related documents (e.g., images, style sheet) in the client cache, assembles them together into a hypertext markup language (HTML) page and returns the HTML page back to the web browser (417). In contrast, if the cached copy is deemed stale or if there is cache miss, the client cache assistant submits a document retrieval request to a corresponding remote cache server (415).

An exemplary document retrieval request, shown in FIG. 3B, includes a URL. Optionally, the retrieval request includes one or more of: certain content fingerprints, one or more freshness parameters specified by the client cache assistant, one or more header fields found in the original HTTP GET request and the URL and the content fingerprints of other documents associated with the requested one. For instance, if the client cache assistant has a stale copy of the requested document, the document retrieval request may include header fields from the stale copy of the document, such as "If-Modified-Since" and/or "If-None-Match". The document retrieval request, in a particular embodiment, may even be compressed prior to being sent to the remote cache server in order to reduce transmission time. Note that all the items in the retrieval request other than the URL fingerprint are optional. For instance, if the client cache assistant does not find a copy of the requested document in the client cache, none of the information for these optional fields is available to the client cache assistant. In some embodiments, the client cache assistant will include certain content fingerprints in the retrieval request. The content fingerprints will be used by the server to identify which client object to generate the content difference against once a server object is found or obtained. For example, if no content fingerprint was sent by the client cache assistant in the retrieval request then the server object would be compared against a null client object and the content difference would represent the whole server object. Most commonly, the content fingerprint associated with URL would be placed in the retrieval request. In some embodiments, the client cache assistant might include more than one content fingerprint. Other fingerprints might include the last document visited by the client on the same host, and/or the homepage of the host (i.e., removing the path information from the URL of the requested URL. In these embodiments, the remote cache server 124 launches its server object lookup (described below) with the multiple content fingerprints, and uses the first lookup to return a client object when generating the content difference. Alternatively, the remote cache server attempts to look up the client objects in the following order and use the first client object returned: (1) content fingerprint, (2) last page visited, and (3) the home page of the host. In some embodiments, other combinations are envisioned, such as only providing (2) and (3) above. Those of skill in the art would recognize many different permutations to achieve the same result. Since the content difference is generated using the client object and the server object, choosing a client object which is similar to the server object or a newly obtained server object will reduce the amount of information in the content difference returned to the client. Other methodologies beyond the two mentioned above could be envisioned as providing some possible ways to reduce the average size of the content difference.

Figure 5:
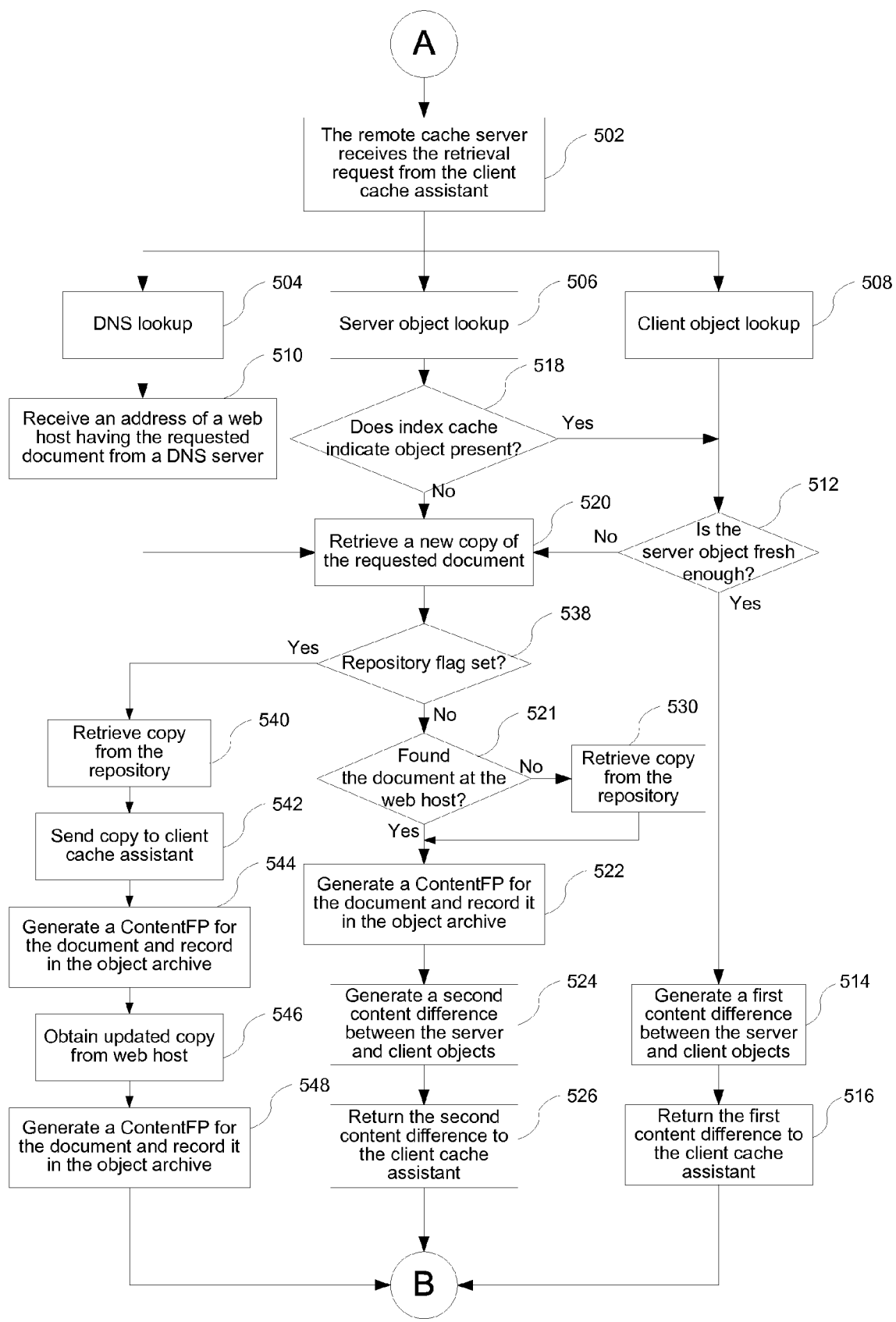
FIG. 5 is a flowchart illustrating a series of procedures performed by the remote cache server upon receipt of a document retrieval request.

FIG. 5 is a flowchart illustrating a series of procedures or actions performed by the remote cache server upon receipt of a document retrieval request. After receiving the document retrieval request (502), the remote cache server may need to decompress the request if it has been compressed by the client cache assistant. Next, the remote cache server launches three lookups (504, 506, 508) using some of the request parameters. The three lookup operations (504, 506, 508) may be performed serially or in parallel with each other (i.e., during overlapping time periods). For instance, DNS lookup 504 may be performed by a different server or process than object lookups 506 and 508, and thus may be performed during a time period overlapping lookups 506 and 508. Object lookups 506 and 508 both access the same databases, but nevertheless may be performed during time periods that at least partially overlap by using pipelining techniques.

At 504, the remote cache server identifies the IP address of the web host through a DNS lookup. Please refer to the discussion below in connection with FIG. 7 for more details about the DNS lookup. At 506, the remote cache server attempts to identify a copy of the requested document on the server by performing a server object lookup using the document's URL fingerprint. If found, the document copy is called the "server object." By contrast, the copy of the requested document found in the client cache is commonly referred to as the "client object," which is identified by the remote cache server using the client object's content fingerprint embedded in the document retrieval request (508). It should be noted that if the received request does not include a client object content fingerprint (e.g., because no client object was found in the client cache), the remote cache server does not launch a client object lookup at 508.

There are three distinct scenarios associated with the results coming out of the server object lookup (506) and the client object lookup (508) against the object archive:
1. Each of the two lookups returns an object;
2. The server object lookup returns an object and the client object lookup returns nothing; and
3. Neither of the two lookups returns an object.

In the first scenario, the server object and the client object may be identical if they share the same content fingerprint. If not, the server object is newer than the client content. The second scenario may occur when the remote cache server downloads and stores the server object in response to a previous document retrieval request from another client. Note that the freshness of the server object will nevertheless need to be evaluated before it is used to respond to the current document retrieval request. In the third scenario, the remote cache server may have never received any request for the document, or the corresponding object may have been evicted from the server's caches due to storage limitations or staleness of the object.

The server object lookup (506) comprises two phases. The first phase is to find the content fingerprint of the server object by querying the index cache using the requested document's URL fingerprint. In some embodiments, this query is quite efficient because the index cache is small enough to be stored in the server's main memory. If no entry is found in the index cache, not only is the second phase is unnecessary, there is even no need for the client object lookup, because the initial lookup results fall into the third scenario. However, if a content fingerprint is identified in the index cache, the second phase of the server object lookup is to query the object archive for the server object's content and other relevant information using the identified content fingerprint from the first phase. Meanwhile, the remote cache server may also query the object archive for the client object's content using the content fingerprint embedded in the document retrieval request, if any.

If a server object is found in the object archive (518), the remote cache server examines the server object to determine if the server object is fresh enough to use in a response to the pending document request (512). If the server object has an associated expiration date, it is quite easy to determine the freshness of the server object. If not, a secondary test may be used to determine the server object's freshness. In one embodiment, a simple test based on the document's LM-factor is used to determine the server object's freshness. The LM-factor of a document is defined as the ratio of the time elapsed since the document was cached in the object archive to the age of the document in accordance with the date/time assigned to it by its host. If the LM-factor is below a predefined threshold, e.g., 50%, the document is treated as fresh; otherwise, the document is treated as stale. However, there may also be some embodiments or situations where a document is determined to be stale according to the freshness parameters or other information and may nevertheless be used despite its age. This may occur, for instance, when a fresh copy of the document is not available from its host.

If the server object is deemed to be fresh and its content is different from that of the client object, the remote cache server generates a first content difference between the server object and the client object (514). The content difference may be generated, based on the content of the content and server objects, using any suitable methodology. A number of such methodologies are well known by those skilled in the art. Some of these methodologies are called differential compression.

If only a server object and no client object was found, the first content difference is essentially the same as the server object. At 516, the remote cache server returns the first content difference to the client cache assistant for the preparation of an appropriate response to the application. In one embodiment, the content difference is compressed by the remote cache server before being sent to the client cache assistant so as to reduce transmission time over the connection between the remote cache server and the client cache assistant. In another embodiment, compression is not used. In yet another embodiment, compression is used only predefined criteria are met, such as a criterion that a size of the content difference (or a size of the response that includes the content difference) exceeds a threshold.

When the server object is deemed not sufficiently fresh (512), or no server object is found in the object archive (518), the remote cache server retrieves a new copy of the requested document from the document's host, or in some embodiments, the search engine repository 140 (520). In the embodiments including the repository flag of table 213 described earlier, and when the repository flag is set (538), the remote cache server 124 obtains the document from the search engine repository 140 (540). In instances where the repository interface 138 and remote cache server 124 have updated the index cache 122 for a document not yet requested, the index cache 122 will contain an entry (including the repository flag to use the search engine repository 140), and yet no corresponding document copy will be resident in the object archive 128. The document is obtained from the search engine repository 140 and sent to the client cache assistant 106 (542). In some embodiments, a content fingerprint is generated for the document, the document is recorded in object archive 128, and the various tables are updated (544). Regardless of whether this document is recorded (as in 544), a new copy of the document content is obtained from the document's web host (546), a content fingerprint is generated for the document, the document is recorded in object archive 128, and the various tables are updated (548).

If the repository flag is not set or the embodiment does not include the flag, then the document is requested from the web host (521). After receiving the document, the remote cache server registers the new document in its index cache and object archive (522) as a new server object. The registration includes generating a new content fingerprint for the new document and creating a new entry in the index cache and object archive, respectively, using the new content fingerprint. A more detailed discussion of downloading documents from a web host is provided below in connection with FIG. 8. Next, the remote cache server generates a second content difference between the new server object and the client object (524) and returns the second content difference to the client cache assistant (526).

As mentioned above, there is no guarantee that the remote cache server will be able to download a new copy of the requested document from the web host. For example, the web host may be temporarily shut down, the web host may have deleted the requested document from its file system, or there may be network traffic congestion causing the download from the web host to be slow (e.g., the download time is projected, based on the download speed, to exceed a predefined threshold). If any of these scenarios occurs, the search engine repository 140 (FIG. 1) becomes a fallback for the remote cache server to rely upon in response to a document request. As shown in FIG. 5, if the remote cache server is unable to retrieve a current copy of the requested document from the web host (521-No), it may turn to the repository for a copy of the requested document that is cached in the repository (530). Since the search engine frequently updates its repository, the repository may have a fresher copy than the server or client copy (i.e., the server or client object).

Having access to a repository copy is extremely helpful when no server/client object is identified in either the client cache or the server object archive, and access to the web host is not currently available. In this case, the repository becomes the only source for responding to the document request with a document, as opposed to responding with an error message indicating that the document is not available. Even though there is no guarantee that the repository copy always has the same content as the copy at the web host, it is still preferred to return the repository copy than to return an error message. This is especially true if the requested document has been deleted from the web host's file system. To avoid confusing the user, the client cache assistant may attach to the response a notice indicating that the document being returned may be stale.

A document download request from the remote cache server to the host of the requested document is not necessarily triggered by a user request as indicated above. In particular, the document download request may be initiated by the remote cache server independent of any request from a client computer. For instance, the remote cache server may periodically check the expiration dates of the documents cached by the remote cache server by scanning each entry in the index cache. If a document has expired or is about to expire, e.g., within a predefined expiration time window, the remote cache server will launch a download request for a new version of the document to the web host, irrespective of whether there is a current client request for the document. Such a document download transaction is sometimes referred to as "prefetching".

Document prefetching, however, generates an entry in the web host's access log that is not tied to an actual view of the prefetched document. Therefore, in one embodiment, if a real client request for the document falls within the predefined expiration time window, the remote cache server initiates a document prefetching while responding to the user request with the "almost-expired" version of the document from the server object archive. If the prefetched version is determined to be the same as the "almost-expired" version (as determined by comparing the content fingerprints of the two document copies or versions) the remote cache server simply renews the "almost-expired" version's expiration date without taking any further action. If the prefetched version is different from the "almost-expired" version, the remote cache server generates a new content difference between the prefetched version and the "almost-expired" version and transmits this content difference to the client cache assistant. In yet another embodiment, the remote cache server not only prefetches documents from the various web hosts but also precalculates the content differences between the new server objects corresponding to the prefetched documents and the next most recent server objects in the server object archive, and caches the precalculated content differences in its object archive for later use when a user requests these documents. This feature is particularly effective when applied to those documents that are updated and visited frequently. The stored content difference could be available via the content fingerprints and indicate which contents had been compared. Prefetching is discussed in more detail referring to FIGS. 17 and 18 below.

In an alternative embodiment, the processes of generating the first content difference (514) and returning the first content difference (516) precede the process of determining the freshness of the server object (512). So when the remote cache server generates the second content difference (524), the client cache assistant has received or is in the process of receiving the first content difference. As a result, the second content difference is not between the new server object and the original client object, but between the new server object and the old server object (which is now the new client object). A more detailed discussion of how the remote cache server transfers multiple content differences to the client cache assistant is provided below in connection with FIG. 9.

Figure 6:
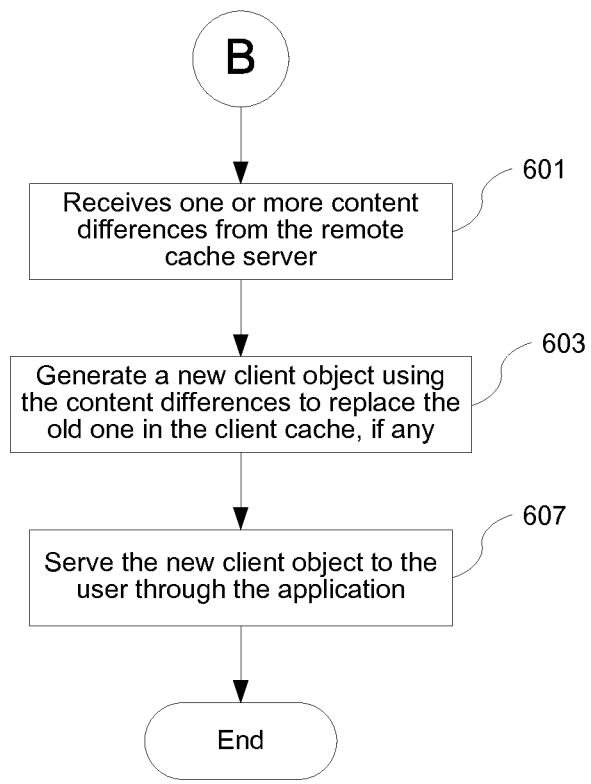
FIG. 6 is a flowchart of procedures performed by the client cache assistant when it receives one or more content differences from the remote cache server.

FIG. 6 is a flowchart describing a process performed by the client cache assistant after receiving one or more content differences from the remote cache server (601). If the content differences, according to one embodiment, have been compressed by the remote cache server before being sent out, the client cache assistant decompresses them accordingly prior to any further action. In some embodiments, the client cache assistant also retrieves all the resources associated with new client object in the same manner. Note that each associated document, e.g., an embedded image or subdocument, goes through the same process discussed above in connection with FIG. 5, because the document retrieval request includes every associated document's URL fingerprint as well as the associated client content fingerprint when there is a client cache hit for the associated document. If neither the requested document nor any of its embedded documents are found in the client cache, all of the needed documents will be downloaded from the remote cache server, using the process described earlier with respect to FIG. 5. At 603, the client cache assistant merges the content differences and, if it exists, the old client object in the client cache, into a new client object. Finally, the client cache assistant serves the new client object to the user through an application, such as a web browser (607).

Figure 7:
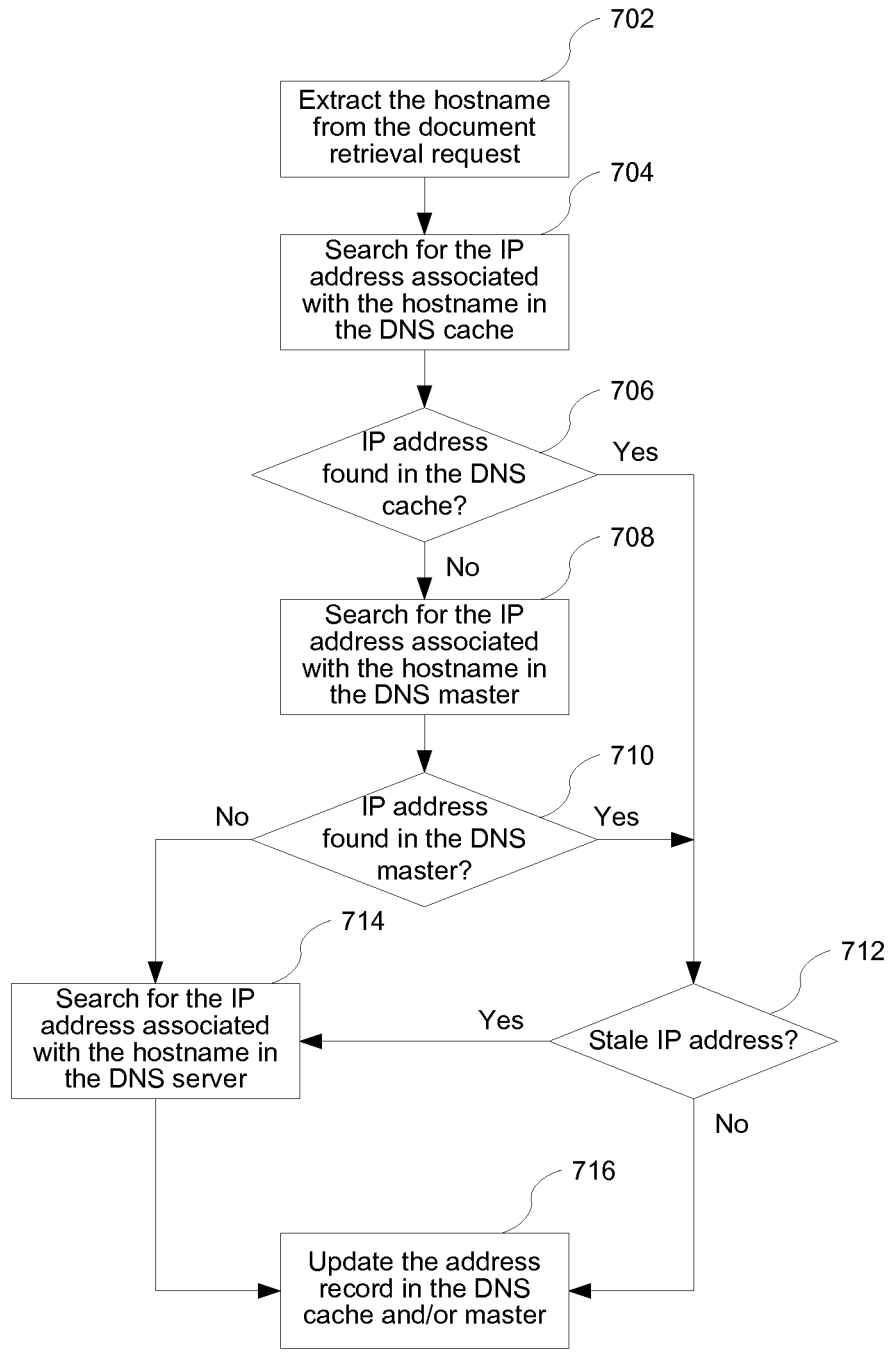
FIG. 7 is a flowchart illustrating details of DNS lookup.

FIG. 7 is a flowchart illustrating one embodiment of a DNS lookup process. After receiving the document retrieval request, the remote cache server extracts the hostname of the web server that hosts the requested document from the request (702). This hostname needs to be translated into an IP address for the remote cache server to download the document from the corresponding web server.

The first option is to search the DNS cache 126 (FIG. 1) associated with the remote cache server for the hostname's IP address (704). In one embodiment, the DNS cache 126 is located in the memory of the remote cache server, which has a relatively small capacity compared with the DNS master 130. The address records in the DNS cache 126 are updated such that any address record in the DNS cache 126 is presumptively fresh and may be used by the remote cache server. Therefore, in one embodiment, an address record found in the DNS cache (706) is returned to the remote cache server and the DNS lookup stops at 707. In another embodiment, after the IP address is returned (707), the DNS master (708) is queried for the returned IP address. A benefit of a DNS master-based query following a cache hit at 706 is that the DNS master may determine the user visit frequency with respect to a particular IP address and determine an appropriate DNS refresh schedule for the address record.

If no address record is found in the DNS cache 126 (706-no), the remote cache server must query the DNS master for the IP address associated with the hostname (708). If no IP address is found (710-no), the DNS master submits a request for resolving the hostname to a DNS server 136 (714). The DNS server 136 is sometimes herein called the "third-party DNS server", to distinguish it from the DNS master. Otherwise (710-yes), the DNS master returns the IP address found in the DNS master to the remote cache server (711) for at least submitting a document downloading request to the web server identified by the IP address.

In some embodiments, the IP address found in the DNS master may not be sufficiently fresh (712) or may soon be deemed stale. If the IP address is not stale (712-no), the DNS master may still update one or more parameters (e.g., LUT, TTL, user visit frequency) of the address record containing the IP address in the DNS master (717). For example, the DNS master may update the user visit frequency of the address record, which, as discussed below, might affect the record's self-refresh priority.

If the IP address is stale (712-yes), the DNS master will submit a request to the third-party DNS server (714). Upon receiving the IP address from the third-party DNS server, the DNS master updates itself (716), returns the IP address (718) to the requesting remote cache server and updates the corresponding address record in the DNS cache (720). While updating the appropriate address record in the DNS master, the DNS master may update one or more of the aforementioned parameters in the address record.

If the IP address found at 710-yes is deemed stale or soon to be stale, then the DNS master submits a request for resolving the hostname to the third-party DNS server 136 (714). The remote cache server may still download a document using the stale IP address returned at 711, but in this instance, it will withhold the downloaded document temporarily until a new IP address is returned by the third-party DNS server (714). If the new IP address is identical to the stale one, the downloaded document is sent to the client cache assistant. Otherwise, the remote cache server discards the temporarily withheld document and downloads another copy using the new IP address.

Note that the DNS lookups discussed above in connection with FIG. 7 are needed not only when the remote cache server receives a document retrieval request from a client cache assistant, but also in embodiments that support document prefetching. In the latter case, the remote cache server tries to resolve the IP address for every embedded link, or a selected subset of the embedded links in a newly downloaded document, because there is a likelihood of the documents associated with the embedded links being used in the near future.

The resolution of IP addresses for the hostnames of the embedded links in a document may trigger the DNS master to submit multiple DNS resolution requests to the third-party DNS server. It is well understood that DNS resolution through a third-party DNS server is a time-consuming process and avoided where possible. In order to improve the remote cache server's response time, the DNS master may be configured to self-refresh the address records when pre-defined criteria are met. In one embodiment, the DNS master prioritizes an address record's self-refresh schedule according to its TTL and user visit frequency. For instance, the DNS master may be configured to perform a self-refresh at least a few minutes before an address record's TTL expires. In some embodiments, addresses having a higher user visit frequency are be granted a higher priority for self-refresh. Other well-known prioritization strategies are contemplated. The DNS master then updates entries, if needed, in the DNS cache, thus maintaining the freshness of those entries.

In one embodiment, when a web host is found to have a new IP address that is different from the existing one stored in the DNS master, this is interpreted as indicating that the web host has also updated the content of the requested document. The remote cache server therefore terminates the other two lookups (506 and 508 in FIG. 5) and downloads a new copy of the requested document using the new IP address (at 520 in FIG. 5).

Figure 8:
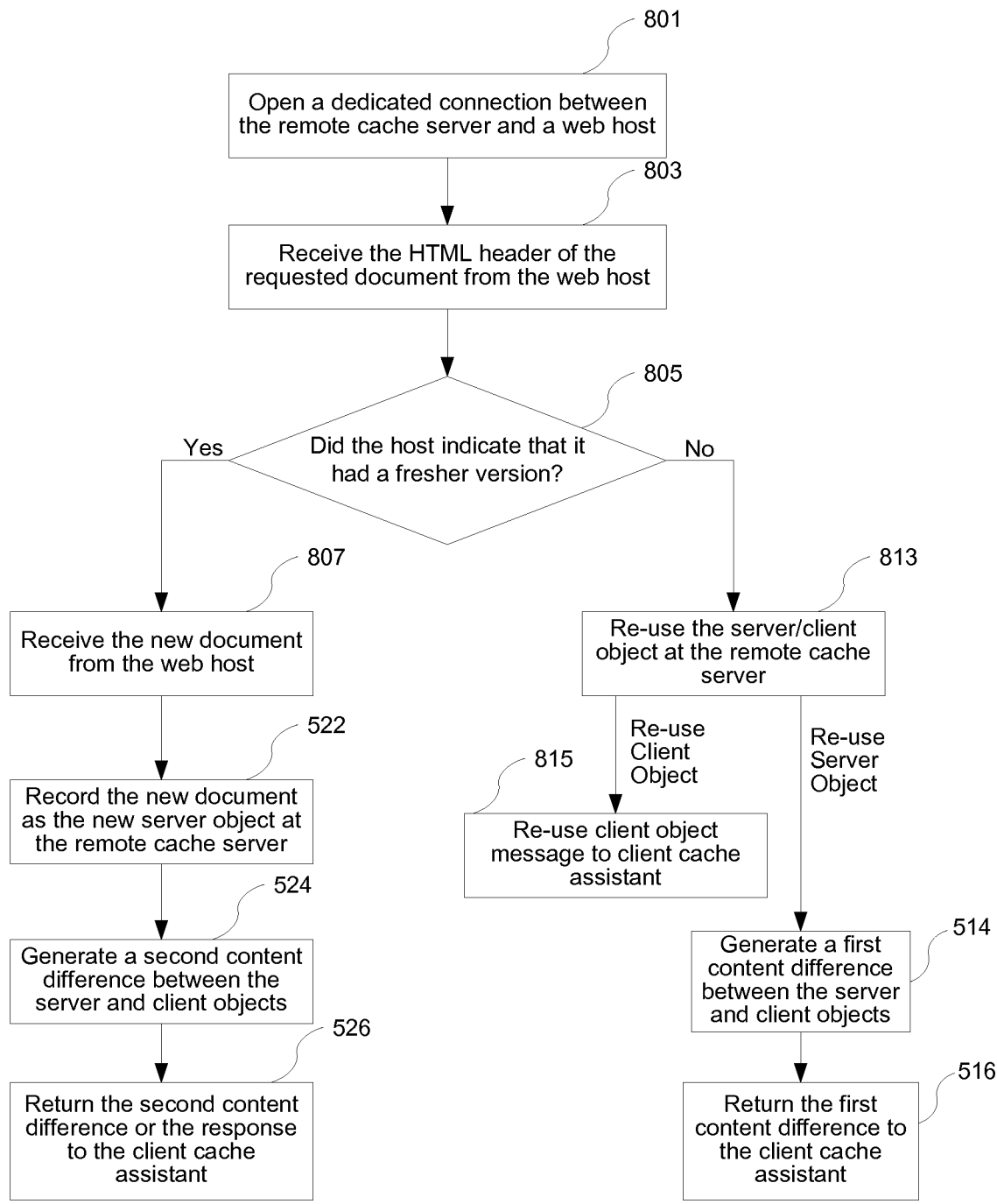
FIG. 8 is a flowchart depicting how the remote cache server downloads a new document from a corresponding host using the IP address identified through DNS lookup.

The ultimate purpose of the DNS, server object and client object lookups (504, 506, 508) is to provide information necessary for downloading a new document from a web host. These three processes are coordinated by the remote cache server and their respective results "converge" at 520 in FIG. 5. FIG. 8 is a flowchart depicting how the remote cache server downloads a new document from the corresponding web host using the IP address identified by the DNS lookup. To download documents, the remote cache server needs to first establish a connection with the web host (801). In one embodiment, this connection is a non-dedicated connection, such as an HTTP connection. In another embodiment, the remote cache server maintains a pool of connection objects for establishing dedicated, persistent connections between itself and various web hosts. If there is already an existing connection between the remote cache server and the web host, the remote cache server simply re-uses this existing connection to download the new document. If not, the remote cache server creates a new connection by selecting an unused connection object from the pool.

An exemplary download request generated by the remote cache server is shown in FIG. 3C. The download request comprises the IP address of the web host and a plurality of header fields. These header fields typically include one or more standard HTTP request header fields, such as "If-Modified-Since" or "If-None-Match" which help to avoid downloading a document whose content is identical to the server or client object.

In response to the download request, the web host returns an HTTP response to the remote cache server (803) which will indicate whether the document was found and its freshness. The web host could indicate that it does not have a fresher version, the document was not found, or that it is transmitting the document because it had a fresher version (805). If the web host has a fresher version, the remote cache server proceeds to download the document as well as any associated documents from the web host (807), creates a new content fingerprint for each of the newly downloaded documents, registers the newly downloaded documents in its index cache and object archive as the new server object (522) and generates a second content difference between the new server object and the client object (or the old server object) at 524. At 526 the remote cache server returns the second content difference or the "Not Modified" response to the client cache assistant. If not (805-No), the remote cache server re-uses the existing server or client object at 813. In one particular embodiment, the remote cache server generates a content difference of null, or zero which causes the client cache assistant to use the same object when responding to the request to the application. If the server object is to be reused, the remote cache server generates a first content difference between the server object and the client object (514), and sends the first content difference to the client cache assistant (516).

In some embodiments, the remote cache server sometimes "manipulates" the content of a newly downloaded document to improve the user experience before storing the document or generating the second content difference. For instance, if the newly downloaded document comprises slow redirect instructions such as META-tag style redirects or Javascript style redirects, the remote cache server may replace them with more efficient immediate HTTP redirects. In another example, the remote cache server may eliminate certain portions of the documents deemed to be of low importance, e.g., whitespaces or comments, to make the remaining content more compressible. If the document fails to specify the parameters of an embedded image, e.g., its width or height or both, the remote cache server may modify the document to provide the missing parameter values so as to expedite the rendering of the image on the client. The remote cache server may also remove popup windows, advertisement banners or other content from newly downloaded documents either in accordance with a predefined set of rules, or in accordance with a rules specified by a particular client or user.

Figure 9:
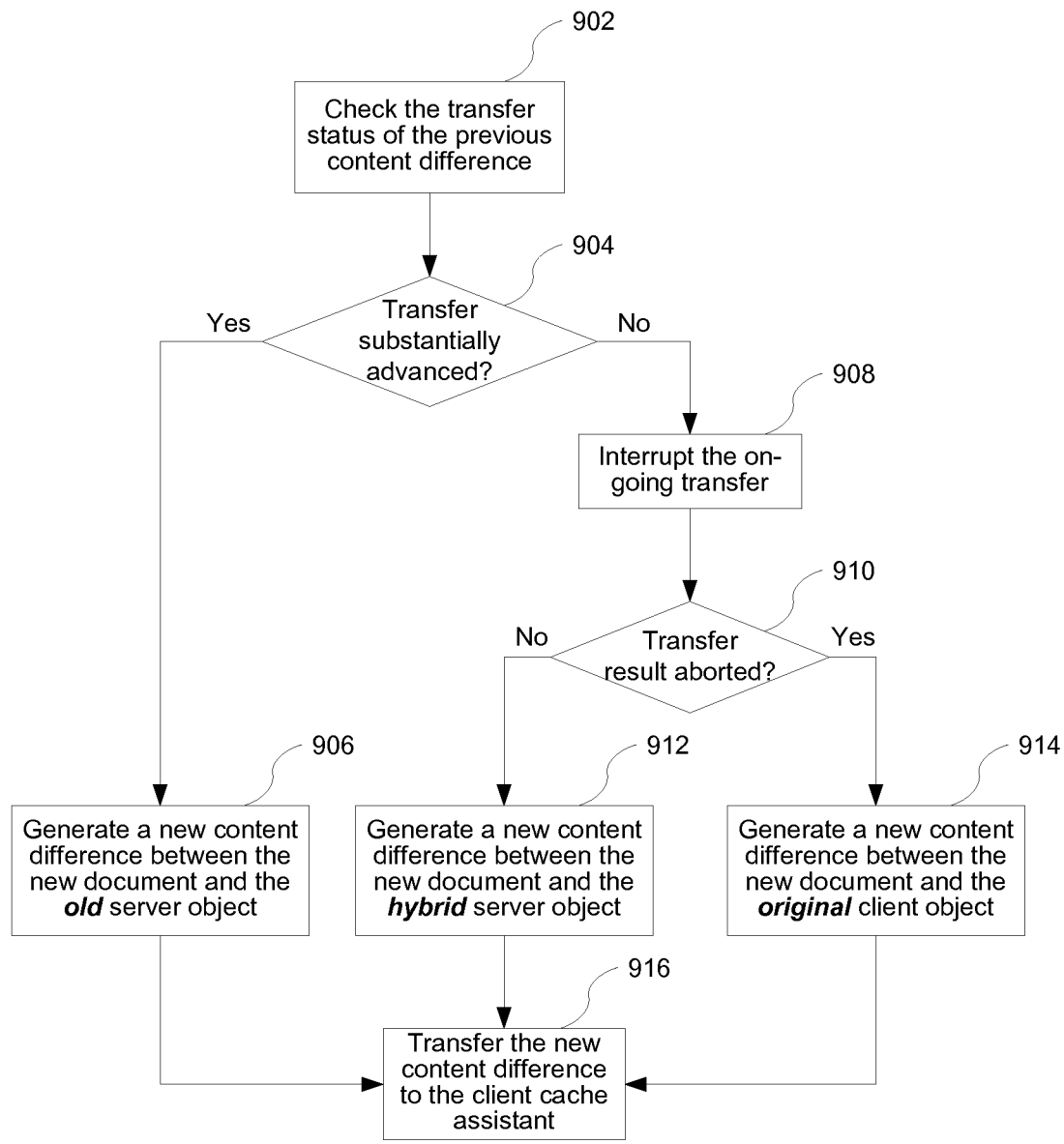
FIG. 9 is a flowchart describing how the remote cache server coordinates with the client cache assistant during the transfer of content differences.

As mentioned above in connection in FIG. 5, in some alternative embodiments the remote cache server may generate multiple content differences in response to a single document retrieval request and transfer those content differences back to the client cache assistant in a non-sequential manner so as to reduce the idle time of the connection between the remote cache server and client cache assistant. In one embodiment, the content difference associated with the current server object includes a parameter, e.g., a flag, notifying that the client cache assistant can assemble the multiple content differences and the original client object together and serve the assembled result to the requesting user. FIG. 9 is a flowchart describing how the remote cache server coordinates with the client cache assistant during the transfer of the content differences in accordance with one embodiment of the present invention.

Prior to the generation of the second content difference, the remote cache server checks the status of the transfer of the first content difference (902). If the transfer of the first content difference has advanced substantially, e.g., more than 50% of the first content difference has been received by the client cache assistant, the remote cache server may decide to let the transfer be completed. In this case, the remote cache server generates the second content difference between new server object and the old server object (906) and then transfers the second content difference to the client cache assistant (916). The generation of the second content difference overlaps, at least in part, with transmission of the first content difference to the client cache assistant.

In some embodiments, if substantial process has not yet been made with respect to the transfer of the first content difference, the remote cache server terminates the transfer (908). As a result, the client cache assistant receives an incomplete content difference. If the incomplete content difference constitutes only a minor portion of the first content difference (910), the client cache assistant may abandon it and the remote cache server, in turn, generates a new content difference between the new server object and the original client object (914). If the incomplete content difference constitutes a significant portion of the first content difference, the client cache assistant may choose to keep the incomplete first content difference to save data transmission time. Based upon the client cache assistant's decision, the remote cache server generates a content difference between the new server object and the combination of the old server object and the original client object (912).

In one embodiment, the process of loading content differences from the remote cache server to the client cache assistant is actually an on-going process independent from any specific user request for documents. For example, the remote cache server may choose to preload content differences related to those documents that are frequently requested by users through a particular client cache assistant whenever it detects a content change to a document. Since the preloading is not triggered by any particular user request, the remote cache server may assign a relatively low priority data stream to the preloading process and reserve data streams with high priorities for the loading process in response to a user request. However, the remote cache server may upgrade the priority of a data stream associated with the preloading process using a corresponding control stream once it receives a user request for a document that is currently being preloaded. Preloading is discussed in more detail in reference to FIGS. 17 and 18 below.

Figure 10:
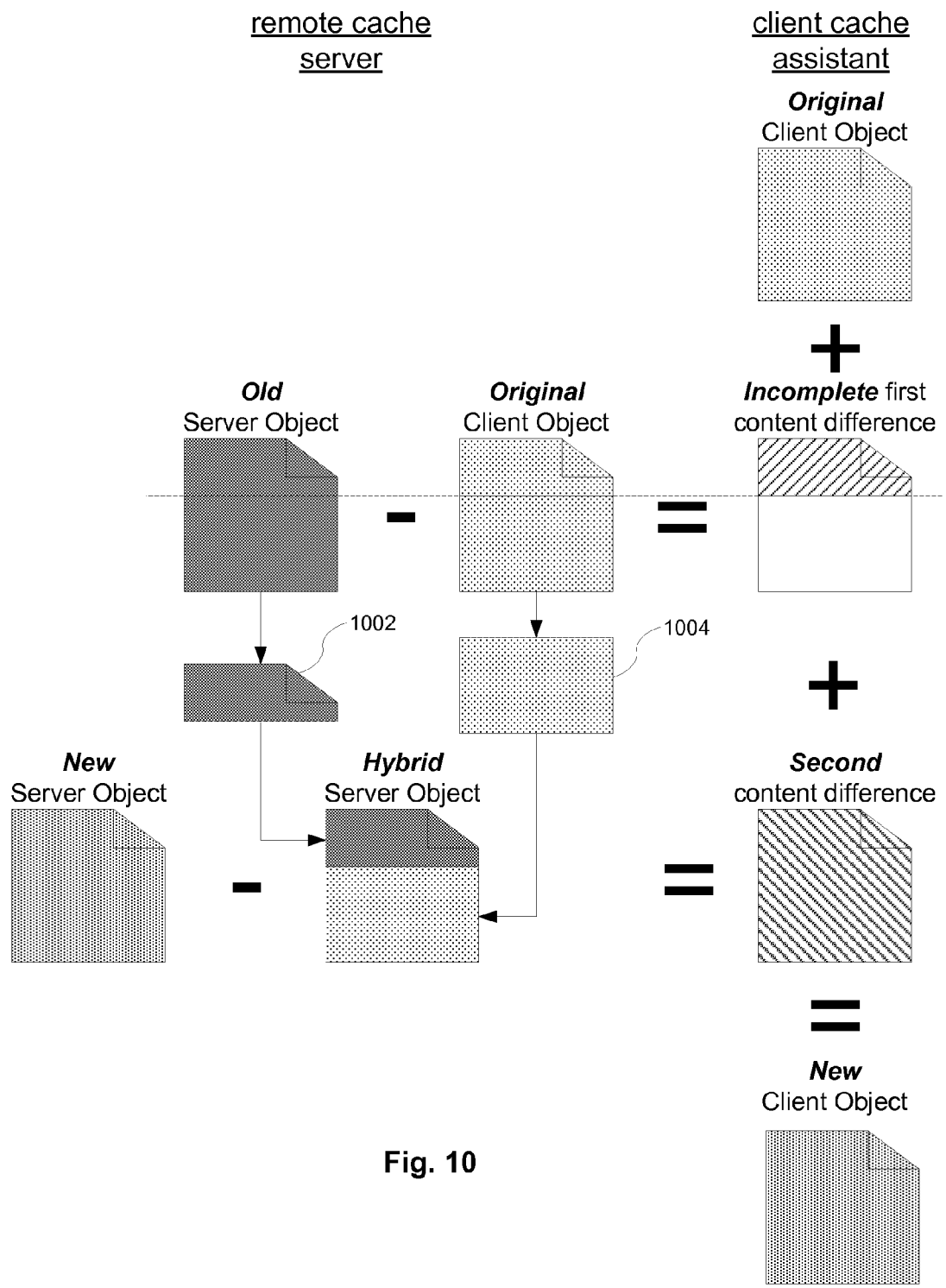
FIG. 10 schematically illustrates how the remote cache server and client cache assistant cooperate when the transfer of a first content difference is interrupted.

FIG. 10 schematically illustrates how the remote cache server and client cache assistant coordinate with each other when the client cache assistant decides to keep the incomplete content difference. Based upon the incomplete content difference, the remote cache server identifies a location in the old server object and original client object at which the transfer is terminated, and combines the top 1002 of the old server object and the bottom 1004 of the original client object to form a hybrid server object. Next, the remote cache server generates a second content difference between the new server object and the hybrid server object and sends it to the client cache assistant. At the end, the client cache assistant combines the original client object, the incomplete first content difference and the second content difference to create a new client object which is identical to the new server object on the server side.

Figure 11:
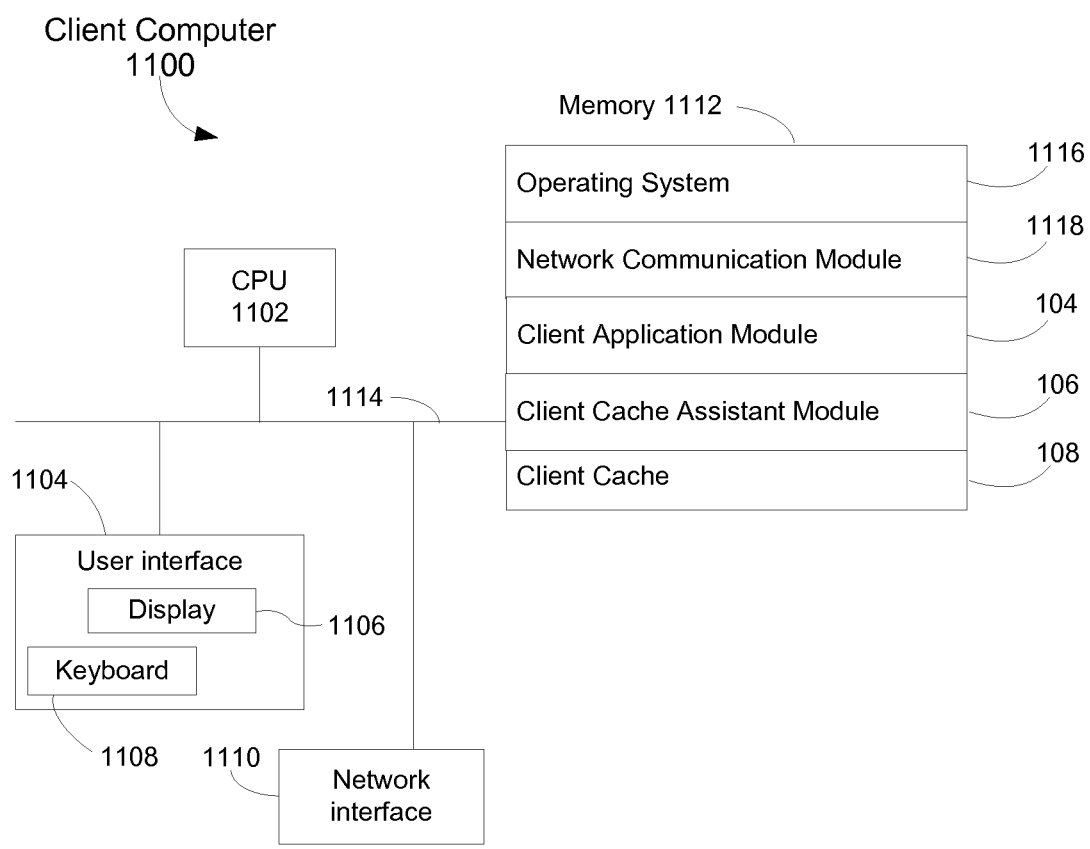
FIG. 11 depicts the structure of an exemplary client computer that operates the client cache assistant.

FIG. 11 depicts a client computer 1100 in accordance with one embodiment of the present invention, which typically includes one or more processing units (CPU's) 1102, one or more network or other communications interfaces 1110, memory 1112, and one or more communication buses 1114 for interconnecting these components. The client computer 1100 typically includes a user interface 1104, optionally comprising a display device 1106 and a keyboard 1108. Memory 1112 includes high speed random access memory and optionally includes non-volatile memory, such as one or more magnetic disk storage devices. In some embodiments, memory 1112 stores:

- an operating system 1116 that includes procedures for handling various basic system services and for performing hardware dependent tasks;
- a network communication module (or instructions) 1118 that is used for connecting the client computer 1100 to other computers via the one or more communication network interfaces 1110;
- an application (or instructions) 104, such as a web browser application, for receiving a user request for a document and rendering the requested document on a computer monitor or other user interface device;
- a client cache assistant module (or instructions) 106, as described elsewhere in this document; and
- a client cache 108.

Figure 12:
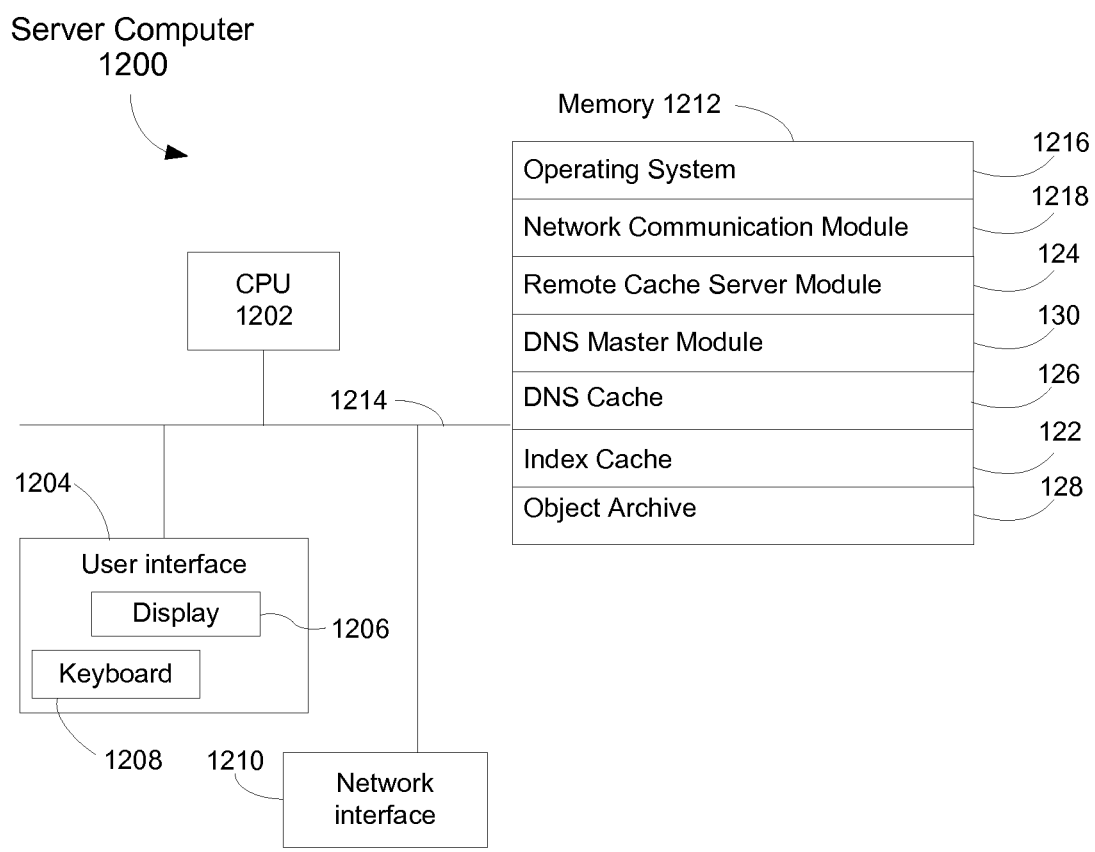
FIG. 12 depicts the structure of an exemplary server computer that operates the remote cache server.

Similarly, FIG. 12 depicts a server computer 1200 in accordance with one embodiment of the present invention, which typically includes one or more processing units (CPU's) 1202, one or more network or other communications interfaces 1210, memory 1212, and one or more communication buses 1214 for interconnecting these components. The server computer 1200 optionally includes a user interface 1204 comprising a display device 1206 and a keyboard 1208. Memory 1212 includes high speed random access memory and optionally includes non-volatile memory, such as one or more magnetic disk storage devices. Memory 1212, or alternatively one or more storage devices (e.g., one or more non-volatile storage devices) within memory 1212, includes a computer readable storage medium. In some embodiments, memory 1212 or the computer readable storage medium of memory 1212 stores:

- an operating system 1216 that includes procedures for handling various basic system services and for performing hardware dependent tasks;
- a network communication module (or instructions) 1218 that is used for connecting the server computer 1200 to other computers via the one or more communication network interfaces 1210 and one or more communication networks, such as the Internet, other wide area networks, local area networks, metropolitan area networks, and the like;
- a remote cache server module (or instructions) 124 for receiving a document retrieval request from a client cache assistant, generating a new server object and content differences and transferring the content differences back to the client cache assistant 106;
- a DNS master module (or instructions) 130 for retrieving the IP address of a web server that hosts the requested documents;
- a DNS cache 126 for storing records that map hostnames to IP addresses;
- an index cache 122 for managing a plurality of objects' identification records, each record further comprising an object's URL fingerprint, a content fingerprint and multiple document content freshness parameters of the object; and
- an object archive 128 for managing a plurality of object records, each record further comprising an object's content fingerprint and a copy of the object's document content.

Figure 13:
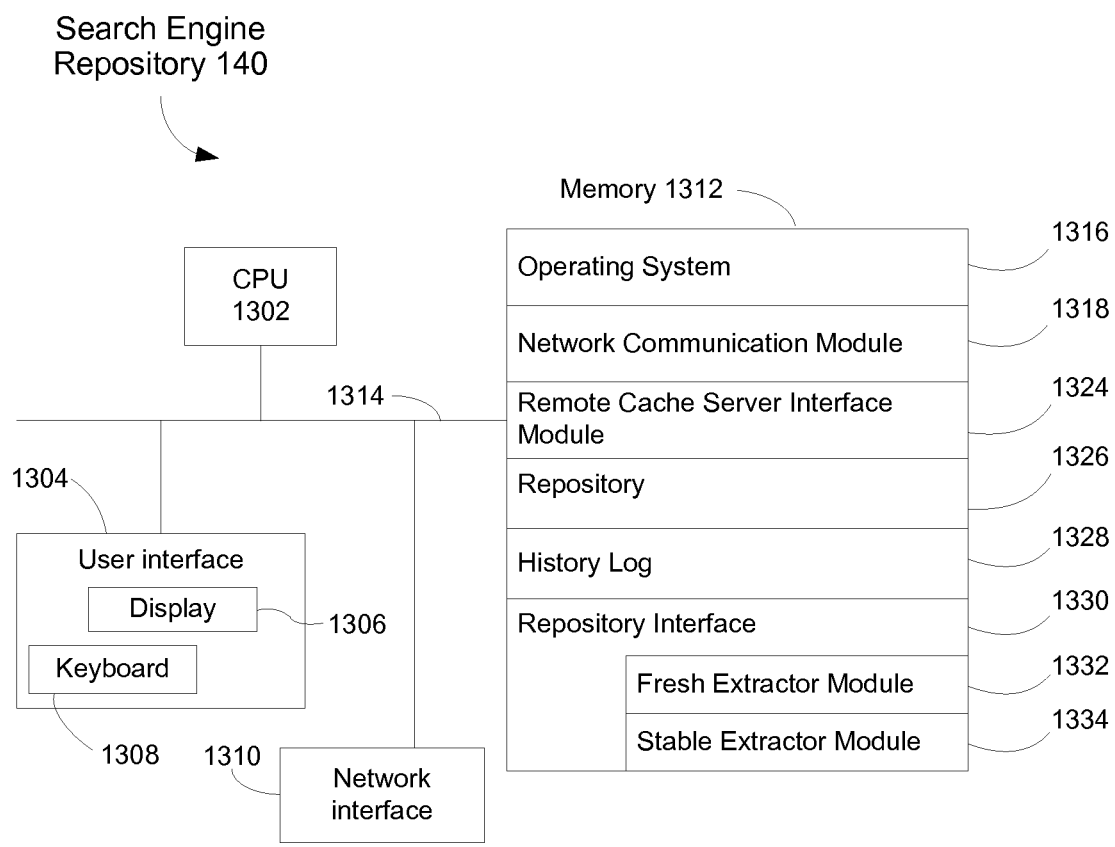
FIG. 13 depicts an exemplary search engine repository.

Finally, FIG. 13 depicts a search engine repository 140 in accordance with one embodiment of the present invention, which typically includes one or more processing units (CPU's) 1302, one or more network or other communications interfaces 1310, memory 1312, and one or more communication buses 1314 for interconnecting these components. The search engine 1300 optionally includes a user interface 1304 comprising a display device 1306 and a keyboard 1308. Memory 1312 includes high speed random access memory and optionally includes non-volatile memory, such as one or more magnetic disk storage devices. In some embodiments, the search engine repository is distributed over a large number (e.g., hundreds, or thousands) of servers, which are collectively represented by the system shown in FIG. 13. In some embodiments, memory 1312 of the search engine repository 140 stores:

- an operating system 1316 that includes procedures for handling various basic system services and for performing hardware dependent tasks;
- a network communication module (or instructions) 1318 that is used for connecting the search engine repository 140 to other computers via the one or more communication network interfaces 1310 (wired or wireless), such as the Internet, other wide area networks, local area networks, metropolitan area networks, and so on;
- a remote cache server interface module (or instructions) 1324 for preparing documents in response to a document request from a remote cache server;
- a repository 1326 for storing a large volume of documents; the repository 1326 may have a structure similar to that of the client cache or server object repository, as shown in FIG. 2, or use distinct set of data structures to store and enable fast access to the documents in the repository 1326; in some embodiments, some or all of the records in the repository 132 include document content freshness parameters to enable evaluation of the freshness of the documents in the repository 1326;
- a history log 1328 that contains information regarding the documents in the repository 1326; and
- a repository interface 1330 for communicating with the remote cache server 124 and for examining the history log 1328, including a fresh extractor module 1332 for determining which documents in the repository 1326 are fresh and stable extractor module 1334 for determining which documents in the repository 1326 are stable.

Although history log 1328 and the repository interface 1330 are illustrated as part of memory 1312, these are shown within memory 1312 simply for illustrative purposes. In some embodiments, the history log 1328 and the repository interface 1330 will reside on other servers, such as servers associated with a search engine or search engine crawler.

Figure 14:
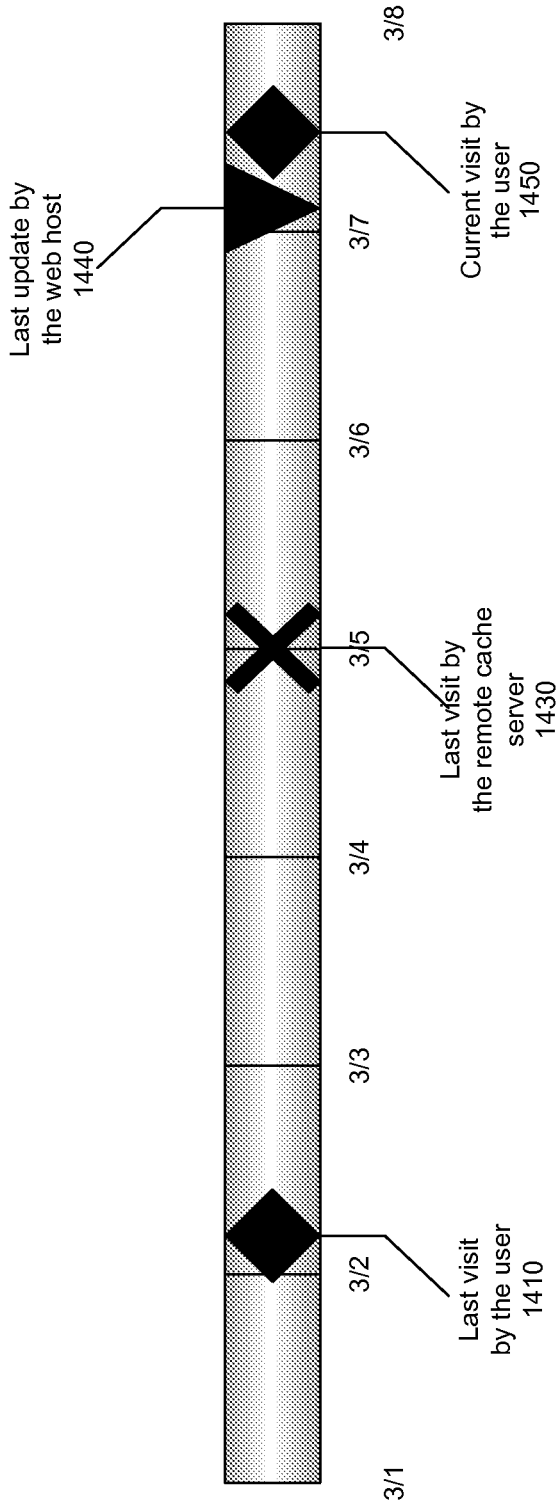
FIG. 14 is an exemplary timeline useful for illustrating how a system according to one embodiment of the present invention searches its several caches and ultimately a web host (or a search engine repository) to respond to a document request submitted by a user through a client computer.

For illustrative purposes, FIG. 14 provides an example illustrating how a system according to one embodiment searches through its several caches as well as a web host to respond to a request for a document submitted by a client computer. The process includes a series of decisions leading to a compromise between two conflicting goals: reducing latency, while attempting to avoid presenting stale document content to the requestor.

Suppose that on the morning of Mar. 7, 2004, a user types a URL of a website, http://www.python.org/, into a web browser operating in a client to access the website's homepage. In this example, it is assumed that the user's last visit 1410 to the homepage occurred on Mar. 2, 2004. In other words, the client cache assistant in the client has a cached copy of the homepage that is about five days old. It is also assumed that the remote cache server's last visit 1430 to the website occurred on Mar. 5, 2004. Therefore, the remote cache server has another copy of the homepage which is two day old. For illustrative purposes, it is further assumed that the web server hosting the website has just updated the homepage 1440 a few hours ago.

In response to the user's command, the web browser submits an HTTP GET request for the homepage to the client cache assistant. In one embodiment, the GET request includes the following HTTP header fields:

| | |
|---|---|
| Request-Line: | GET http://www.python.org/ HTTP/1.0 |
| Accept: | image/gif, image/x-xbitmap, image/jpeg, image/pjpeg, */* |
| Accept-Language: | en-us |
| User-Agent: | Mozilla/4.0 (compatible; MSIE 5.5; Windows NT 5.0) |
| Host: | www.python.org |
| Proxy-Connection: | Keep-Alive |

Upon receipt of the GET request, the client cache assistant searches its client cache and identifies the five-day-old homepage in the cache. In this example, it is assumed that the cached homepage does not have an associated expiration date/time, which is a common phenomenon. Without an expiration date/time, and a client cache copy that is a few days old, the client cache copy is automatically assumed by the client cache assistant to be potentially stale. Thus, the client cache assistant submits a document retrieval request to the remote cache server. The document retrieval request, besides the information specified in the GET request's header, includes the following additional header fields:

| | |
|---|---|
| If-Modified-Since: | Tue, 02 Mar 2004 08:07:10 GMT |
| If-None-Match: | "199faa-1842-19d9199e" |
| URL Fingerprint: | "0x0323efd056b" |
| Content Fingerprint: | "0x07e111eec01dda7a" |

The reason for including the two additional HTTP header fields, "If-Modified-Since" and "If-None-Match", is to inform the remote cache server that it already has a five-day-old copy of the homepage and the copy's entity tag is "199faa-1842-19d9199e". In other words, the client cache assistant is only interested in a new copy of the homepage that is fresher than what is currently in the client cache. The two fingerprints of the cached homepage are used by the remote cache server to do a server object lookup and a client object lookup.

Upon receiving the document retrieval request, the remote cache server initiates the three lookups using the hostname "www.python.org", the content fingerprint "0x07e111eec01dda7a" and the URL fingerprint "0x0323efd056b", respectively. For instance, the DNS lookup resolves the IP address "194.109.137.226" of the web host by querying the DNS cache, the DNS master or an external DNS server, if necessary. As mentioned above, the object archive is a mapping from a content fingerprint of a document to an actual copy of the document's content. Therefore, the client object lookup returns a copy of the homepage that is cached on the client side, which is thereafter used as the basis for generating a content difference between a server object and a client object (see, e.g., processes 514 and 524 in FIG. 5).

The server object lookup attempts to map the URL fingerprint of the homepage to a content fingerprint in the index cache stored in the main memory. In one embodiment, the remote cache server locates an entry in the index cache including the following set of header fields:

| | |
|---|---|
| URL Fingerprint: | "0x0323efd056b" |
| Content Fingerprint: | "0xb5a7d7e111da7a11" |
| Index Date: | Sat, 06 Mar 2004 15:30:21 GMT |
| Last-Modified: | Fri, 05 Mar 2004 05:17:50 GMT |
| Expires: | N/A |
| Entity Tag: | "5a7586-39b3-3e66d9fe" |

The "Index Date" field and the "Last-Modified" field suggest that this entry was created in the index cache about one day ago, while the server object itself is about two days old. The "Expires" field is filled with "N/A" because the web host did not specify a lifetime for the server object. Since the content fingerprint of the server object "0xb5a7d7e111da7a11" is different from that of the client object "0x07e111eec01dda7a" and its content is at least three days fresher than that of the client object, the remote cache server must decide whether the two-day-old server object is sufficiently fresh. In one embodiment, the LM-factor of a server object is defined as the ratio between the age of its index entry and the age of the server object itself. The LM-factor of the server object in this example is 50% (one day vs. two days), which the remote cache server may assess as being too high (and thus too risky) for the server object to be treated as fresh (i.e., it is deemed potentially stale).

In some embodiments, the remote cache server generates the first content difference between the server object and the client object and transmits the first content difference back to the client cache assistant even if the server object is deemed potentially stale. At the same time, the remote cache server sends a download request to the web host located at the IP address of "194.109.137.226" for the homepage's current content.

When preparing the download request, the remote cache server makes the following modifications to the header fields as received from the client cache assistant:

The "If-Modified-Since" header uses the date returned from the index entry, i.e., "Fri, 5 Mar. 2004 05:17:50 GMT";

The "If-None-Match" header uses the entity tag returned from the index entry, i.e., "5a7586-39b3-3e66d9fe";

The "Accept-Encoding" header always includes gzip; and

The "Accept" header may include more formats than the formats supported by the web browser (the remote cache server converts the downloaded document to the formats supported by the web browser).

Had the content of the homepage not been updated by the web host after March 5th, either one of the two header fields, "If-Modified-Since" or "If-None-Match", would have informed the web host that a response including the homepage's current content is unnecessary, because it will be identical to that of the server object. In this case, the web host's response is simply a HTTP response header comprising the following header fields:

| | |
|---|---|
| Response-Line: | HTTP/1.1 304 Not Modified |
| Date: | Sun, 07 Mar 2004 10:53:57 GMT |
| Server: | Apache/1.3.26 (Unix) |
| Connection: | Keep-Alive |
| Keep-Alive: | timeout = 15, max = 100 |
| Entity Tag: | "5a7586-39b3-3e66d9fe" |

In this particular example, since the homepage was updated just a couple of hours ago, it will be sent back the remote cache server to replace the two-day-old server object and the HTTP response header will be something like this:

| | |
|---|---|
| Response-Line: | HTTP/1.1 200 OK |
| Date: | Sun, 07 Mar 2004 10:53:57 GMT |
| Server: | Apache/1.3.26 (Unix) |
| Last-Modified: | Sun, 07 Mar 2004 08:34:09 GMT |
| Entity Tag: | "5a7522-39b3-3e6a3633" |
| Accept-Ranges: | Bytes |
| Content-Length: | 14771 |
| Connection: | Keep-Alive |
| Keep-Alive: | timeout = 15, max = 100 |
| Content-Type: | Text/html |

The remote cache server deletes the index cache entry (but not the object archive entry) corresponding to the old server object, generates a new entry for the new server object in the index cache and saves the new server object in its object archive. Assuming that the transfer of the first content difference has been completed, the remote cache server accordingly generates a second content difference between the new server object and the old server object and transmits the second content difference to the client cache assistant. Finally, the client cache assistant merges the first and second content differences with the five-day-old client object to generate a new client object, which is then sent to the web browser for rendering.

In this example, the homepage includes five links to images and one link to a style sheet. As a result, it is not enough for the web browser to render the homepage using only the new client object. In one embodiment, as the new client object makes its way to the web browser, the web browser makes GET requests similar to the one for the homepage for other documents associated with the homepage. The client cache assistant checks if the associated documents can be located in its cache, and if not, sends document retrieval requests to the remote cache server, which either identifies the associated documents in its object archive or sends requests to the corresponding web hosts. In this particular example, since the client cache assistant has the five-day-old homepage in its client cache, it will likely finds a copy of each of the associated documents in its client cache. Since these associated documents are more likely to be static than the homepage itself, the client cache assistant will re-use them unless the remote cache server returns a new version of these documents.

In another embodiment, the system operates in a more preemptive fashion. In particular, the client cache assistant, includes not only the homepage's URL and content fingerprints, but also the associated documents' URLs and content fingerprints in its document retrieval request. The remote cache server, upon receipt of the document retrieval request, processes each document therein one by one, following a same set of procedures as discussed above. Consequently, the client cache assistant receives not only content differences corresponding to the homepage itself, but also content differences corresponding to the associated documents, if they have been updated as well.

Figure 15:
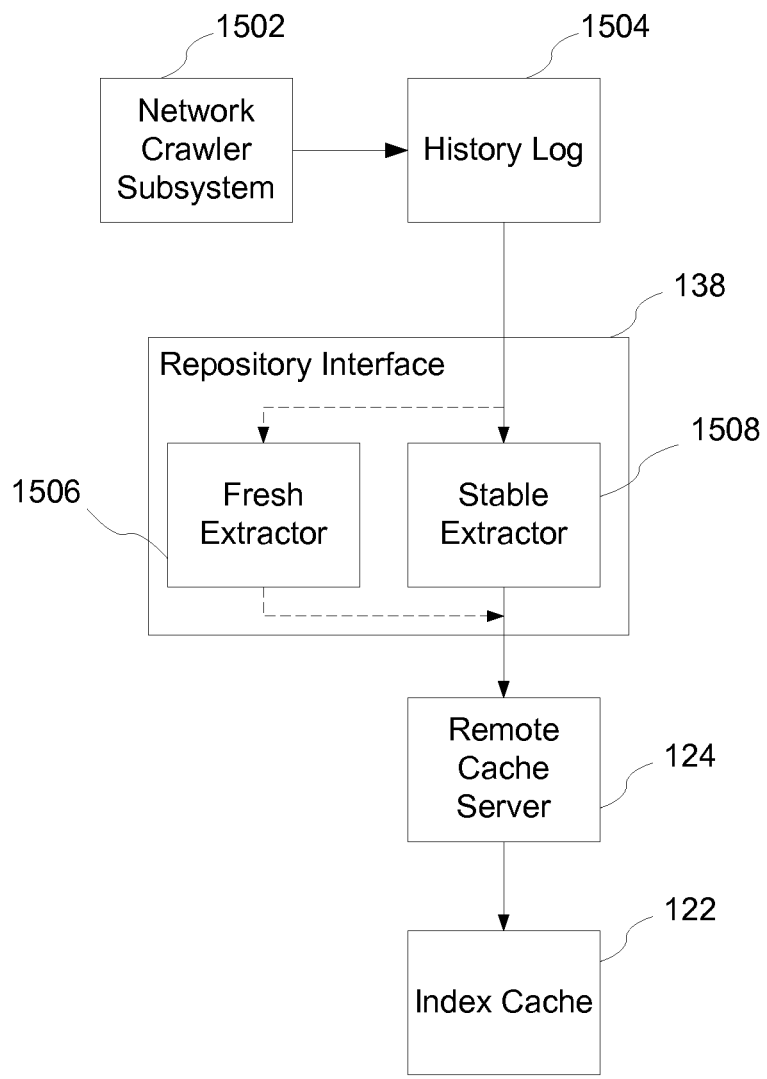
FIG. 15 schematically illustrates how an embodiment of the invention can be connected to a search engine history log.
Figure 16:
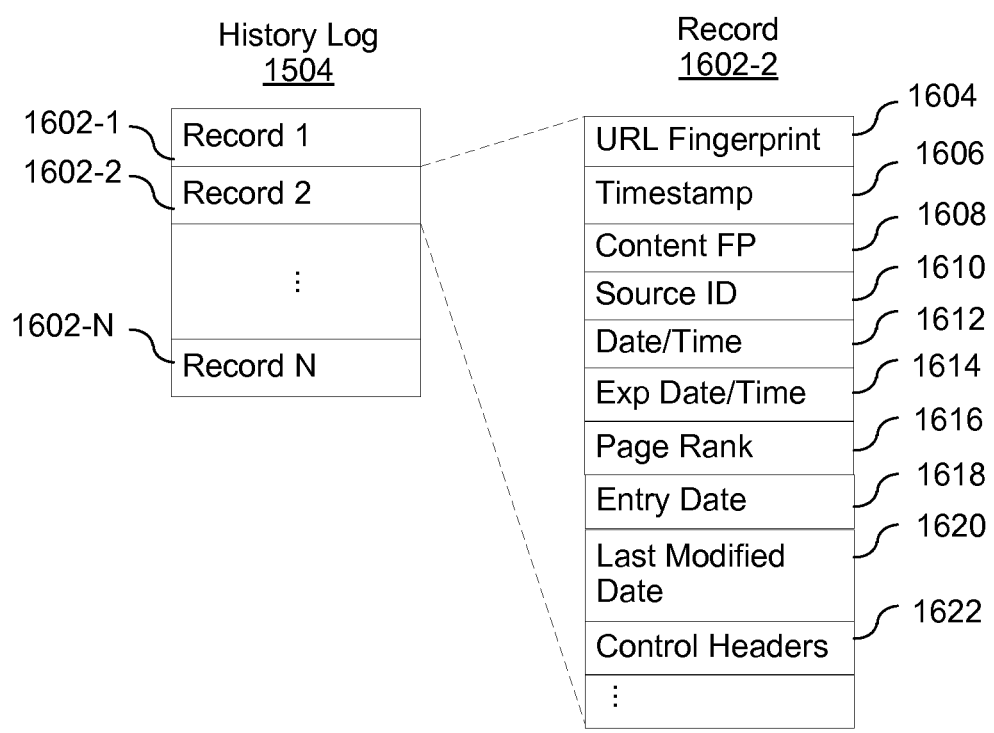
FIG. 16 illustrates the data structure of a history log and associated record.

The embodiments using the repository interface 138 and repository flag in table 213 are described in reference to FIGS. 15 and 16. As illustrated in FIG. 15, a network crawler subsystem 1502 interfaces with a history log 1504. Although mentioned here and elsewhere as a history log for the purpose of simplicity, the history log 1504 is simply an example of a database of information regarding the documents in a search engine repository. Other databases containing information about the documents could be used. The network crawler subsystem 1502 is a system that, among other things, includes collecting documents on a network based on certain conditions and parameters. Copies of the documents are typically stored in a central or decentralized storage system such as search engine repository 140. When used in conjunction with a search engine, the network crawler subsystem 1502 is responsible for populating the search engine repository and index on which the search and indexing algorithms of the search engine are applied. The network that is crawled by the network crawler subsystem 1502 could range in size from a small local area network to the Internet. As the network crawler subsystem 1502 obtains content from various locations across the network, it generates the history log 1504. The history log 1504 contains information about the documents loaded into the search engine and will be described in more detail below referring to FIG. 16.

The repository interface 138 interfaces with the history log 1504 and the remote cache server 124. The repository interface 138 includes a stable extractor 1508. The stable extractor 1508 uses the history log 1504 to identify documents that are identified as having reached a certain level of stability such that the copy of the document in the search engine repository 140 has a high probability of being the same as the document on the document's original host. Accordingly, the remote cache server 124 should initially use the copy of the document from the search engine repository 140, which in many cases will be delivered faster. Alternatively, or in combination with the stable extractor 1508, the repository interface 138 may include a fresh extractor 1506. The fresh extractor 1506 uses the history log to identify documents in the search engine repository 140 which may have been recently retrieved and stored. For these documents it may be faster to have the documents initially delivered from the search engine repository 140 rather than from the original web host where the document originated.

Information about the fresh or stable documents identified by the repository interface 138 is then sent to the remote cache server 124 for merging into the index cache 122. This merging includes setting of the repository flag in the index cache records for the identified documents to indicate that these documents should be obtained from the search engine repository 140. This has the beneficial feature of saving the time and effort in contacting the original document host to obtain a copy of the requested document. In some embodiments, a document identified by the repository interface 138 is entered into the index cache 122 only if the index cache 122 does not already have an entry for the same document. In other embodiments the entry in the index cache 122 will be modified and the flag set when the document copy in the search engine repository 140 is identified as being fresher than the copy in the object archive 128. In some embodiments, an entry in the cache index 122 will be modified by changing one or more of the freshness parameters of the entry based on stability information obtained by the stable extractor 1508 for the corresponding document. This may occur, for example, in situations where the stability information obtained from the repository indicates a greater degree of stability than indicated by the freshness parameters in the entry. Other embodiments could combine the two approaches.

Referring to FIG. 16, an exemplary structure of the history log 1504 is shown. The history log 1504 includes a plurality of records 1602, each of which contains information about a particular document present in the search engine repository 140. An exemplary record 1602-2 shows in more detail some of the information which may be present in the history log 1504 for each record 1602. The record 1602-2 may contain a URL fingerprint 1604, a timestamp 1606, a content fingerprint 1608, a source ID 1610, a date/time value 1612, an expiration date/time 1614, a page rank 1618, an entry date 1618, a last modified date 1620, and control headers 1622. Of course, other fields may also be present. The URL fingerprint 1604 is similar to the URL fingerprint described above in connection with FIG. 2A and represents a normalized and hashed value of the URL from where the document was obtained. The timestamp 1606 indicates at what time the document associated with the URL fingerprint 1604 was obtained by the network crawler subsystem 1502. The content fingerprint 1608 is similar to the content fingerprint described in connection with FIG. 2A, representing the contents of the document and being useful for document comparisons. The date/time value 1612 provides the date/time given the document by the document's host system and may provide an indication of its creation, edit, or validity date and time. The expiration date/time value 1614, when provided by the document's host, is a date, or date and time at which the document content is no longer considered valid. Although referred to here and elsewhere as a date/time, time, or date value, the terms should not be taken to be limiting. The concept is that these are values by which the relative dates and/or times of particular activities can be measured. The page rank 1618 is indicative of a document's importance or popularity in accordance with a query independent ranking used by the search engine. The entry date 1618 indicates the date/time at which the document was indexed or entered in to the document repository. The last modified date 1620, if provided, represents the last time that the web host modified the document. The control headers 1622 provide information about whether a particular document may or may not be cached. Documents whose contents are not to be cached are sometimes termed "private". In some embodiments, these documents having a private attribute are excluded from further examination by the stable extractor 1506 or the fresh extractor 1502 since these documents will not be cached.

The stable extractor 1506 works with the history log 1504 to identify those documents which have reached a level of stability by having not changed recently or not being expected to change in the near future. Accordingly, there is a high likelihood that these documents obtained from the search engine repository 140 reflect the current state of the document on the web host. For example, the stable extractor 1506 could identify those documents which have not changed in the past Y (e.g., a predefined number between 2 and 10) downloads or within a predetermined time period. In some embodiments where the server does not provide a last modified date, this date can be approximated. If the document was unchanged between two successive downloads, the earlier date can be used as an approximation of the last modified date. The earlier and later download dates can be used to compute the LM-factor of the server object (defined as the ratio of the age of its index entry (i.e., the time since the server object was last downloaded or last verified to be to be fresh) the age of the server object itself (i.e., the amount of time since the object was last modified)), which is then compared to a threshold to determine if the server object is stale. In some embodiments, the LM-factor of the object in the search engine repository may by scaled in accordance with the page rank of the object in order to preferentially create cache index entries for popular or important pages. The initially identified set of stable documents may be reduced by selecting a predefined number of those pages having the highest page ranks, or by eliminating identified documents having a page rank 1618 below a predefined threshold. Reducing the set of identified stable documents in this way may help to avoid populating the index cache with information about documents unlikely to be requested by users. The repository interface 138 sends the information about the documents to the remote cache server 124 which uses the information to populate the fields in index cache 122.

From the history log 1504, the fresh extractor 1506 can determine those documents for which the search engine repository 140 has a fresh version within it. In these instances, it may be quicker to obtain the document from the search engine repository 140 than from the document's URL host. A set of fresh documents is identified by the fresh extractor 1506 by examining one or more parameters in a set of history log records and applying a set of predefined criteria to those parameters so as to evaluate document freshness. One method of identifying fresh documents, which in some embodiments may be defined as documents downloaded within a predetermined period of time, is by examining the timestamp value 1606 in a set of history log records. In some embodiments, the number of documents within this set of identified fresh documents may be reduced by selecting a predefined number of those pages having the highest page ranks, or by eliminating identified documents having a page rank 1618 below a predefined threshold. Reducing the set of identified fresh documents in this way may help to avoid populating the index cache with information about documents unlikely to be requested by users. Alternatively, or in combination with the above, the fresh extractor 1506 could examine the expiration date/time value 1614 and determine that it will be some period of time until that document becomes stale. Documents in the identified set whose expiration is not within a predetermined time period could be considered fresh. Alternatively, or in combination, the fresh extractor 1506 could examine the date/time value 1612 and determine those documents having values within a predetermined time period from the current date which could be considered fresh. One of ordinary skill in the art could recognize many different ways to use information from the history log to identify documents which would have a high likelihood of being fresh enough to allow the copy of the document to be obtained from the search engine repository 140 instead of the original host.

Figure 17:
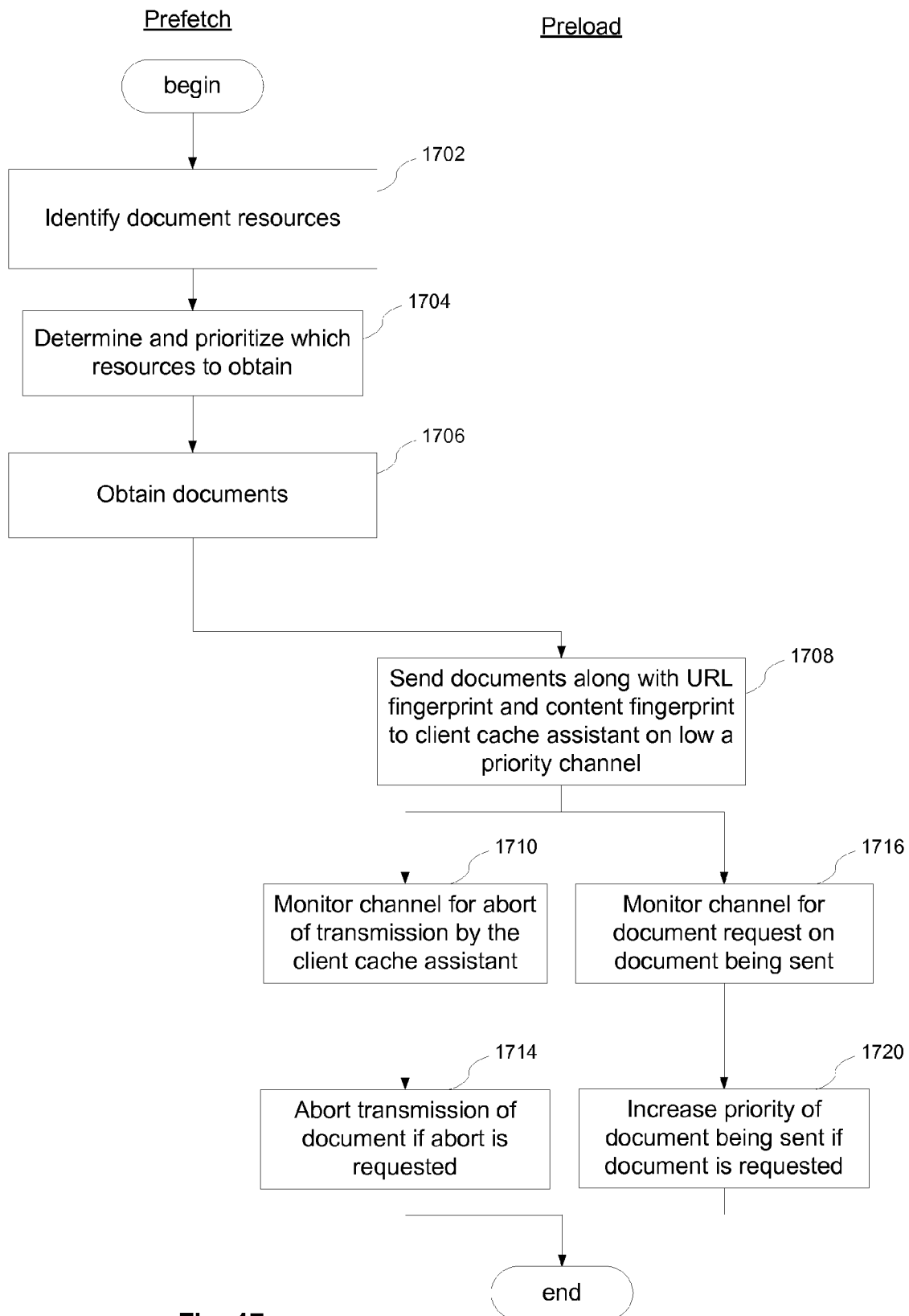
FIG. 17 is a flowchart illustrating the procedures associated with prefetching and preloading document content.

Prefetching and preloading can be used in combination to decrease the latency observed by the user on client 102. For example, when the remote cache server 124 sends a document (or content difference) to the client cache assistant 106, the remote cache server 124 could examine the resources accessed by the document and send them to the client cache assistant before the resources are requested. For example, if the document sent to the client cache assistant 106 represented search results from a previously submitted query to a search engine, then prefetching might be used to obtain at the remote cache server 124 the content of the documents most likely to be selected and preloading might be used to send to the client cache assistant 106 the document contents of those search results (for example, the top three results). The remote cache server 124 would send these documents in a lower priority data stream, which would be converted into a higher priority data stream when the document is actually requested. FIG. 17 illustrates an embodiment for prefetching and preloading in combination although one of skill in the art would recognize these techniques could be used separately. As used herein, the term resources is used broadly to encompass any type of document that might be referenced or used by a client requested document.

When a document is requested by the client cache assistant 106 or is being sent to the client cache assistant 106, the resources in it are identified (1702). If a content difference is being sent to the client assistant 106 then the most recent document content is used. The resources in the document are identified and then prioritized to determine the order and priority for obtaining and sending the resources to the client cache assistant 106 (1704). Prioritization could be done in a variety of ways based on the type of document. For example, as mentioned above, if the document represented search results, then the documents associated with the search results, or a subset thereof comprising the N most highly ranked documents in the search results, could be identified and sent in the order of presentation in the document. Another example might order the documents based on the order of the resource links in the document, e.g., those resources earlier in the document would be obtained before or with a higher priority than those later in the document. The documents would then be obtained (1706) by any of the methods previously described (e.g., examining the index cache and obtaining each of the documents from either the object archive 128, web host 134, or search engine repository 140) and any associated processing would occur (e.g., generating content fingerprints and updating tables).

For a particular document content to be sent, the remote cache server 124 would open a channel, or use an existing one, to send the document's URL fingerprint and content fingerprint in the portion of the data stream prior to the document content (1708). Initially, this stream would be assigned a low priority and, in one embodiment, this is communicated to the client cache assistant 1206 via a control channel. In the client receiving the data steam, any one of three situations might occur, two of which affect the remote cache server 124: (1) the client may recognize from the URL fingerprint and the content fingerprint that it already has the document; or (2) the application 104 requests the document being sent. The third situation is the absence of the other two (i.e., the document was not present and is not requested during its loading). If the client recognizes that it already has the document, it will communicate an abort to the remote cache server 124 (1710), which will then terminate the document transmission (1714). On the other hand, if the client cache assistant 106 indicates that the document being sent is now being requested (1716), then the remote cache server 124 will increase the priority of the transmission of the document (1720). The recognition of the requested document as being the same as the document being downloaded to the client could be done by either the client cache assistant 106 or the remote cache server 124.

The communication channels between the client cache assistant 106 and the remote cache server 124 allow for multiple data streams of varying priorities. One or more control channels may be used to allow the client cache assistant 106 and the remote cache server 124 to exchange control information such as abort or priority information. Different resources being downloaded to the client could be assigned different priorities based on any number of factors. Those of ordinary skill in the art would recognize various way to use prioritization.

Figure 18:
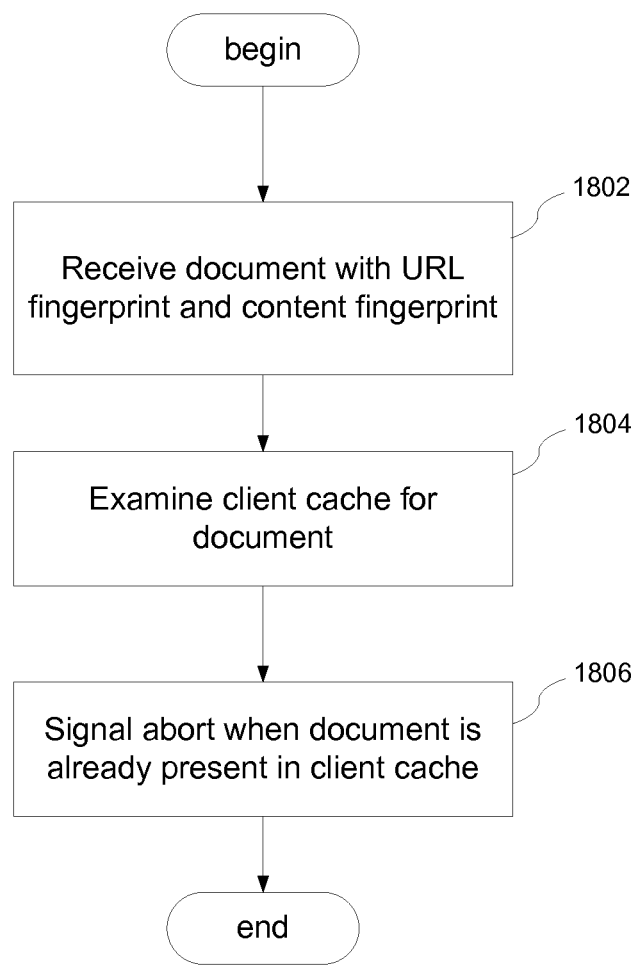
FIG. 18 is a flowchart illustrating the procedures associated with receiving a document content.

FIG. 18 illustrates the activity by the client cache assistant 106 when receiving a document. The client cache assistant 106 receives in a data stream the URL fingerprint and the content fingerprint of the document before the document content arrives (1802). The client cache assistant 106 determines whether the document is already present in the client cache 108 using the URL fingerprint and content fingerprint (1804). It may not be necessary to use the URL fingerprint to make this determination. If the client cache assistant determines that it already has the document, it signals to the remote cache server 124 using the control channel that the remote cache server 124 should abort the transmission.

Although some of various drawings illustrate a number of logical stages in a particular order, stages which are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings.

What is claimed is:

1. A system for domain name server (DNS) caching comprising:
   a memory, including a DNS cache configured to store DNS address records, wherein each DNS address record corresponds to a hostname; and
   one or more processing units, coupled to the DNS cache and configured to:
      prioritize DNS address records in the DNS cache for self-refresh prior to expiration of the respective DNS address records, wherein the DNS address records in the DNS cache are prioritized for self-refresh in accordance with predefined criteria that include user visit frequency associated with IP addresses corresponding to the DNS address records in the DNS cache;
      in accordance with the prioritization of the DNS address records for self-refresh, initiate a DNS resolution request for a hostname of a respective DNS address record of the prioritized DNS address records; and
      update the respective DNS address record based upon a result of the DNS resolution request.

2. The system of claim 1, wherein the one or more processing units are further configured to replace the respective DNS address record with the result of the DNS resolution request.

3. The system of claim 1, wherein the one or more processing units are further configured to extend a time-to-live (TTL) value of the respective DNS address record based upon the result of the DNS resolution request.

4. The system of claim 1, wherein the predefined criteria further comprise criteria with respect to time-to-live values associated with the DNS address records in the DNS cache.

5. The system of claim 1, wherein the one or more processing units are configured to initiate DNS resolution requests for predetermined hostnames in order to store corresponding DNS address records in the DNS cache.

6. A system for domain name server (DNS) caching comprising:
a memory, including a DNS cache configured to store DNS address records, wherein each DNS address record corresponds to a hostname; and
one or more processing units, coupled to the DNS cache and configured to:
determine, for a plurality of DNS address records in the DNS cache, user visit frequency for corresponding IP addresses;
prioritize DNS address records in the DNS cache for self-refresh prior to expiration of the respective DNS address records, wherein the DNS address records in the DNS cache are prioritized for self-refresh in accordance with predefined criteria that include user visit frequency for IP addresses corresponding to the DNS address records in the DNS cache;
in accordance with the prioritization of the DNS address records for self-refresh, initiate a DNS resolution request for a hostname of a respective DNS address record of the prioritized DNS address records; and
update the respective DNS address record corresponding to the hostname based upon a result of the DNS resolution request.

7. The system of claim 6, wherein the one or more processing units are further configured to replace the respective DNS address record corresponding to the hostname with the result of the DNS resolution request.

8. The system of claim 6, wherein the one or more processing units are further configured to extend a time-to-live (TTL) value of the respective DNS address record corresponding to the hostname based upon the result of the DNS resolution request.

9. The system of claim 6, wherein the predefined criteria further comprise criteria with respect to time-to-live values associated with the DNS address records in the DNS cache.

10. The system of claim 6, wherein the one or more processing units are configured to initiate DNS resolution requests for predetermined hostnames in order to store corresponding DNS address records in the DNS cache.

11. A method for domain name server (DNS) caching with one or more processors that utilize a DNS cache to resolve network addresses, comprising:
prioritizing DNS address records in the DNS cache for self-refresh prior to expiration of the respective DNS address records, wherein the DNS address records in the DNS cache are prioritized for self-refresh in accordance with predefined criteria that include user visit frequency associated with IP addresses corresponding to the DNS address records in the DNS cache;
in accordance with the prioritization of the DNS address records for self-refresh, initiating a DNS resolution request for a hostname of a respective DNS address record of the prioritized DNS address records; and
updating the respective DNS address record in the DNS cache based upon a result of the DNS resolution request,
wherein the prioritizing, initiating, and updating steps are performed by the one or more processors.

12. The method of claim 11, wherein the updating comprises replacing the respective DNS address record with the result of the DNS resolution request.

13. The method of claim 11, wherein the updating further comprises extending a time-to-live (TTL) value of the respective DNS address record based upon the result of the DNS resolution request.

14. The method of claim 11, wherein the predefined criteria further comprise criteria with respect to time-to-live values associated with the DNS address records in the DNS cache.

15. The method of claim 11, further comprising initiating DNS resolution requests for predetermined hostnames in order to store corresponding DNS address records in the DNS cache.

16. A method for domain name server (DNS) caching with one or more processors that utilize a DNS cache to resolve network addresses, comprising:
determining, for a plurality of DNS address records in the DNS cache, user visit frequency for corresponding IP addresses;
prioritizing DNS address records in the DNS cache for self-refresh prior to expiration of the respective DNS address records, wherein the DNS address records in the DNS cache are prioritized for self-refresh in accordance with predefined criteria that include user visit frequency for IP addresses corresponding to the DNS address records in the DNS cache;
in accordance with the prioritization of the DNS address records for self-refresh, initiating a DNS resolution request for a hostname of a respective DNS address record of the prioritized DNS address records; and
updating the respective DNS address record corresponding to the hostname in the DNS cache based upon a result of the DNS resolution request,
wherein the determining, prioritizing, initiating, and updating steps are performed by the one or more processors.

17. The method of claim 16, wherein the updating comprises replacing the respective DNS address record corresponding to the hostname with the result of the DNS resolution request.

18. The method of claim 16, wherein the updating further comprises extending a time-to-live (TTL) value of the respective DNS address record corresponding to the hostname based upon the result of the DNS resolution request.

19. The method of claim 16, wherein the predefined criteria further comprise criteria with respect to time-to-live values associated with the DNS address records in the DNS cache.

20. The method of claim 16, further comprising initiating DNS resolution requests for predetermined hostnames in order to store corresponding DNS address records in the DNS cache.

* * * * *